United States Patent [19]

Kitatani et al.

[11] Patent Number: 5,106,712
[45] Date of Patent: Apr. 21, 1992

[54] ELECTROPHOTOGRAPHIC PHOTORECEPTOR CONTAINING BISAZO COMPOUND

[75] Inventors: Katsugi Kitatani; Naonori Makino; Satoshi Hoshi, all of Kanagawa, Japan

[73] Assignee: Fuji Photo Film Co., Ltd., Kanagawa, Japan

[21] Appl. No.: 549,030

[22] Filed: Jul. 6, 1990

[30] Foreign Application Priority Data

Jul. 7, 1989 [JP] Japan ................... 1-176448
Jul. 7, 1989 [JP] Japan ................... 1-176449
Jul. 10, 1989 [JP] Japan ................... 1-177445

[51] Int. Cl.$^5$ .................. G03G 5/047; G03G 5/06
[52] U.S. Cl. .................. 430/58; 430/59; 430/70; 430/71; 430/72; 430/73; 430/74; 430/75; 430/76; 430/77; 430/78; 430/79; 534/653; 534/751; 534/752; 534/753
[58] Field of Search ............ 430/58, 59, 70, 71, 430/72, 73, 74, 75, 76, 77, 78, 79

[56] References Cited

U.S. PATENT DOCUMENTS

| | | | |
|---|---|---|---|
| 4,495,264 | 1/1985 | Takahashi et al. | 430/72 X |
| 4,504,559 | 3/1985 | Makino et al. | 430/76 X |
| 4,977,051 | 12/1990 | Ohno et al. | 430/70 X |
| 4,985,324 | 1/1991 | Kitatani et al. | 430/72 X |
| 5,019,474 | 5/1991 | Makino et al. | 430/76 |

Primary Examiner—Roland Martin
Attorney, Agent, or Firm—Sughrue, Mion, Zinn, Macpeak & Seas

[57] ABSTRACT

A novel electrophotographic photoreceptor is provided comprising on an electrically conductive support a layer containing a charge carrier-transporting compound and a charge carrier-generating compound or a charge carrier-transporting compound-containing layer and a charge-generating compound-containing layer, characterized in that as said charge carrier-generating compound there is contained a novel bisazo compound represented by the general formula (1-A), (1-B) or (1-C):

$$Cp-N=N-Ar^1+(C\equiv C)_n Ar^2-N=N-Cp \quad (1\text{-}A)$$

wherein $Ar^1$ and $Ar^2$ each represents an arylene group, divalent condensed polycyclic aromatic group or divalent heterocyclic aromatic group; Cp represents a coupler residue; and n represents an integer 2 or 3;

$$Cp-N=N-Ar^1-C\equiv C-Ar^2-C\equiv C-Ar^3-C\equiv C-Ar^4-N=N-Cp \quad (1\text{-}B)$$

wherein $Ar^1$, $Ar^2$, $Ar^3$ and $Ar^4$ each represents an arylene group, divalent condensed polycyclic aromatic group or divalent heterocyclic aromatic group; and Cp represents a coupler residue;

$$Cp-N=N-Ar^2-C\equiv C-Ar^1-C=C-Ar^3-N=N-Cp \quad (1\text{-}C)$$
$$\phantom{Cp-N=N-Ar^2-C\equiv C-Ar^1-}\overset{|}{R^5}\ \overset{|}{R^6}$$

wherein $Ar^1$, $Ar^2$, and $Ar^3$ each represents an arylene group, divalent condensed polycyclic aromatic group or divalent heterocyclic aromatic group; Cp represents a coupler residue; and $R^5$ and $R^6$ each represents a hydrogen atom, alkyl group, alkoxy group, cyano group, nitro group or halogen atom.

11 Claims, No Drawings

ELECTROPHOTOGRAPHIC PHOTORECEPTOR CONTAINING BISAZO COMPOUND

FIELD OF THE INVENTION

The present invention relates to an electrophotographic photoreceptor comprising an electrophotographic light-sensitive layer containing a novel bisazo compound.

BACKGROUND OF THE INVENTION

As photoconductive compositions to be incorporated in electrophotographic photoreceptors there have heretofore been well known inorganic substances such as selenium, cadmium sulfide, zinc oxide and amorphous silicon. These inorganic substances are advantageous in that they have excellent electrophotographic properties. In particular, these inorganic substances exhibit an extremely excellent photoconductivity, charge acceptability in a dark place and insulating properties. On the contrary, however, these inorganic substances have ,various disadvantages. For example, selenium photoreceptors are expensive to manufacture, have no flexibility and cannot withstand thermal or mechanical shock. Cadmium sulfide photoreceptors can cause a pollution problem because cadmium is a toxic substance. Zinc oxide is disadvantageous in that it exhibits a poor image stability after repeated use. Furthermore, amorphous silicon photoreceptors are extremely expensive to manufacture and also require a special surface treatment to prevent surface deterioration thereof.

In recent years, electrophotographic photoreceptors comprising various organic substances have been proposed and some of them have been put into practical us to eliminate the disadvantages of inorganic substances. Examples of these approaches include electrophotographic photoreceptors comprising poly-N-vinylcarbazole and 2,4,7-trinitrofluorenone-9-one as disclosed in U.S. Pat. No. 3,484,237, electrophotographic photoreceptors comprising poly-N-vinylcarbazole sensitized with a pyrilium salt dye as disclosed in JP-B-48-25658 (the term "JP-B" a used herein means a "published examined Japanese patent application"), and electrophotographic photoreceptors comprising as a main component a eutectic complex of a dye and a resin a disclosed in JP-A-47-10375 (the term "JP-A" as used herein means an "unexamined published Japanese patent application").

Furthermore, many active studies and proposals have recently been made with regard to electrophotographic photoreceptors comprising as main components organic pigments such as perylene pigment (as disclosed in U.S. Pat. No. 3,371,884), phthalocyanine pigment (as disclosed in U.S. Pat. Nos. 3,397,086 and 4,666,802), azulenium salt pigment (as disclosed in JP-A-59-53850 and JP-A-59-212542), squalium salt pigment (as disclosed in U.S. Pat. Nos. 4,396,610 and 4,644,082) and polycyclic quinone pigment (as disclosed in JP-A-59-84348 and JP-A-62-28738) or the following azo pigments:

Bisazo pigments as disclosed in JP-A-47-37543, JP-A-56-116039, JP-A-58-123541, JP-A-61-260250, JP-A-61-28453, JP-A-61-275849, JP-A-61-275850, JP-A-53-133445, JP-A-59-78356, JP-A-59-128547, JP-A-60-452453, JP-A-61-7150, JP-A-62-251752, JP-A-62-273545, JP-A-64-13555, and JP-A-64-79753, JP-B-60-5941, JP-B-60-45664, and JP-B-63-18740, and U.S. Pat. No. 4,504,559;

Trisazo pigments as disclosed in U.S. Pat. Nos. 4,436,800 and 4,439,506, and JP-A-53-132347, JP-A-55-9148, JP-A-57-195767, JP-A-57-200045, JP-A-57-204556, JP-A-58-31340, JP-A-58-31341, JP-A-58-154560, JP-A-58-60358, JP-A-58-160359, JP-A-59-127044, JP-A-59-196366, JP-A-59-204046, JP-A-59-204841, JP-A-59-218454, JP-A-60-11249, JP-A-60-111250, JP-A-61-11754, JP-A-61-22346, JP-A-61-35451, JP-A-61-67865, JP-A-61-121059, JP-A-61-63969, JP-A-61-179746, JP-A-61-230157, JP-A-61-251862, JP-A-61-251865, JP-A-61-269164, JP-A-62-21157, JP-A-62-78563 and JP-A-62-115452, and JP-B-62-39626, and JP-B-3-10419; and Tetrakisazo pigments as disclosed in U.S. Pat. No. 4,447,513, and JP-A-60-108857, JP-A-60-108858, JP-A-60-11247, JP-A-60-111248, JP-A-60-118843, JP-A-60-176046, JP-A-61-103157, JP-A-61-117559, JP-A-61-182051, JP-A-61-94447, JP-A-61-196253, JP-A-61-212848, JP-A-61-240246, JP-A-61-273548, JP-A-61-284769, JP-A-62-18565, JP-A-62-8566 and JP-A-62-19875.

These electrophotographic photoreceptors can attain some improvement in mechanical properties and flexibility in comparison with the above described inorganic electrophotographic photoreceptors. However, these electrophotographic photoreceptors leave to be desired in sensitivity. These electrophotographic photoreceptors are also disadvantageous in that they may exhibit some change in electrical properties upon repeated use. Thus, these electrophotographic photoreceptors don't necessarily satisfy the requirements for electrophotographic photoreceptors.

SUMMARY OF THE INVENTION

It is therefore an object of the present invention to provide a novel electrophotographic photoreceptor which exhibits a high sensitivity and durability.

It is another object of the present invention to provide a novel electrophotographic photoreceptor which exhibits a small change in light-sensitivity upon repeated use.

The above and other objects of the invention will become more apparent from the following detailed description and examples.

These objects of the present invention are accomplished with an electrophotographic photoreceptor comprising on an electrically conductive support a layer containing a charge carrier-transporting compound and a charge carrier-generating compound or a charge carrier-transporting compound-containing layer and a charge carrier-generating compound-containing layer, characterized in that as said charge carrier-generating compound there is contained a novel bisazo compound represented by the general formula {1-A), (1-B) or (1-C):

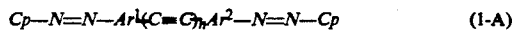
(1-A)

wherein $Ar^1$ and $Ar^2$ each represents an arylene group, divalent condensed polycyclic aromatic group or divalent heterocyclic aromatic group, each of which may have one or more substituents; Cp represents a coupler residue; and n represents an integer 2 or 3;

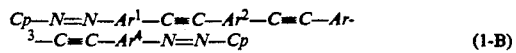
(1-B)

wherein Ar¹, Ar², Ar³ and Ar⁴ each represents an arylene group, divalent condensed polycyclic aromatic group or divalent heterocyclic aromatic group, each of which may have one or more substituents; and Cp represents a coupler residue;

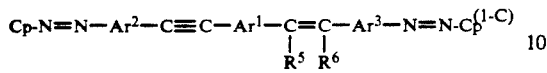

wherein Ar¹, Ar² and Ar³ each represents an arylene group, divalent condensed polycyclic aromatic group or divalent heterocyclic aromatic group, each of which may have one or more substituents; Cp represents a coupler residue; and $R^5$ and $R^6$ each represents a hydrogen atom, alkyl group, alkoxy group, cyano group, nitro group or halogen atom.

DETAILED DESCRIPTION OF THE INVENTION

The bisazo compound represented by the general formulae (1-A), (1-B) and (1-C) will be further illustrated hereinafter.

Examples of the group represented by Ar¹, Ar², Ar³ or Ar⁴ include a $C_{6-30}$ (preferably $C_{6-24}$, more preferably $C_{6-20}$) arylene group such as phenylene, naphthalene, antolylene, biphenylene and terphenylene, a divalent group derived from a $C_{13-30}$ (preferably $C_{13-24}$, more preferably $C_{13-20}$) condensed polycyclic aromatic group such as indene, fluorene, acenaphthene, perylene, fluorenone, anthrone, anthraquinone, benzoanthrone and isocoumarin, and a divalent group derived from a 5- or 6-membered $C_{2-30}$ (preferably $C_{2-24}$, more preferably $C_{2-20}$) heterocyclic aromatic group containing N, S, O or Se as a hetero atom such as pyridine, quinoline, oxazole, thiazole, oxadiazole, benzoxazole, benzoimidazole, benzothiazole, benzotriazole, dibenzofuran, carbazole and xanthene.

If Ar¹, Ar², Ar³ and Ar⁴ contain substituents, examples of such substituents include a $C_{1-18}$ alkyl group, $C_{1-18}$ alkoxy group, dialkylamino group containing two $C_{1-18}$ alkyl groups, $C_{1-18}$ acyl group, $C_{1-18}$ acyloxy group, $C_{1-18}$ amide group, $C_{6-15}$ aryl group, $C_{6-15}$ aryloxy group, halogen atom, hydroxy group, carboxyl group, nitro group, cyano group, and trifluoromethyl group.

If $R^5$ or $R^6$ is an alkyl group, specific examples of such an alkyl group include $C_{1-6}$ alkyl group (e.g., methyl, ethyl, n-propyl, n-butyl).

If $R^5$ or $R^6$ is an alkoxy group, specific examples of such an alkoxy group include a $C_{1-6}$ alkoxy group (e.g., methoxy, ethoxy, n-propoxy, n-butoxy).

If $R^5$ or $R^6$ is a halogen atom, specific examples of such a halogen atom include a fluorine atom, chlorine atom, bromine atom and iodine atom.

Cp represents a known coupler residue which undergoes reaction with a diazonium salt and is preferably a known coupler residue of an azo compound used as a charge carrier-generating compound for electrophotographic photoreceptors. In particular, examples of coupler residues which can be used as Cp include those having the following structural formulae:

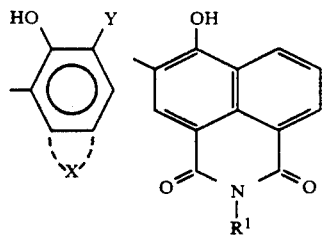

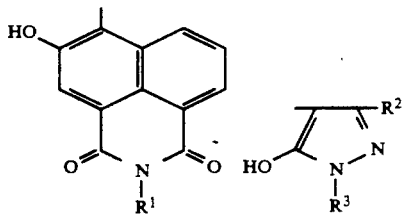

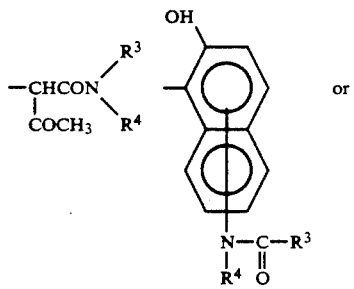

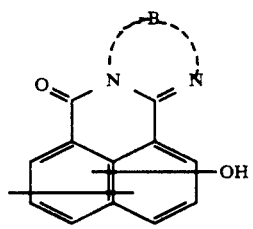

X in the general formula Cp represents an atomic group required to undergo condensation with the benzene ring to which the hydroxyl group and Y are bonded to form an aromatic ring (having 10 to 24 carbon atoms such as naphthalene and anthracene or heterocyclic group (which is 5- to 8-membered and contains 1 to 3 hetero atoms, e.g., N, O, S) such as indole, carbazole, benzocarbazole and dibenzofuran.

If X forms an aromatic ring or heterocyclic group containing substituents, examples of such substituents include a halogen atom (e.g., fluorine, chlorine, bromine), $C_{1-18}$ alkyl group (e.g., methyl, ethyl, propyl, butyl, dodecyl, octadecyl, isopropyl, isobutyl), trifluoromethyl group, nitro group, amino group, cyano group, and $C_{1-8}$ alkoxy group (e.g., methoxy, ethoxy, butoxy). These substituents can be used singly or in combination and can substitute for carbon atoms in any positions.

Y represents —CONR³R⁴, —CONHN=CR³R⁴, —COOR³ or a $C_{3-18}$ 5- or 6-membered heterocyclic group (containing 1 to 3 hetero atoms, e.g., N, O, S) which may contain substituents.

R¹ represents a $C_{1-12}$ alkyl or $C_{6-24}$ aryl group.

If R¹ is an unsubstituted alkyl group, specific examples of such an unsubstituted alkyl group include a methyl group, ethyl group, propyl group, butyl group, pentyl group, hexyl group, isopropyl group, isobutyl group, isoamyl group, isohexyl group, neopentyl group, and tert-butyl group.

If $R^1$ is a substituted alkyl group, examples of such substituents include a hydroxyl group, $C_{1-12}$ alkoxy group, cyano group, amino group, $C_{1-12}$ alkylamino group, dialkylamino group containing two $C_{1-12}$ alkyl groups, halogen atom, and $C_{6-15}$ aryl group. Examples of such a substituted alkyl group include a hydroxyalkyl group (e.g., hydroxymethyl, 2-hydroxyethyl, 3-hydroxypropyl, 2-hydroxypropyl), alkoxyalkyl group (e.g., methoxymethyl, 2-methoxyethyl, 3-methoxypropyl, ethoxymethyl, 2-ethoxyethyl), cyanoalkyl group (e.g., cyanomethyl, 2-cyanoethyl), aminoalkyl group (e.g., aminomethyl, 2-aminoethyl, 3-aminopropyl), (alkylamino)alkyl group (e.g., (methylamino)methyl, 2-(methylamino)ethyl, (ethylamino)methyl), (dialkylamino)alkyl group (e.g., (dimethylamino)methyl, 2-(dimethylamino)ethyl), halogenoalkyl group (e.g., fluoromethyl, trifluoro methyl, chloromethyl), and aralkyl group (e.g., benzyl, phenethyl).

If $R^1$ is an unsubstituted aryl group, specific examples of such an unsubstituted aryl group include a phenyl group, naphthyl group, and anthryl group.

If $R^1$ is a substituted aryl group, examples of substituents which can be contained in such a substituted aryl group include a hydroxyl group, $C_{1-12}$ alkoxy group, cyano group, amino group, $C_{1-12}$ alkylamino group, dialkylamino group containing two $C_{1-12}$ alkyl groups, $C_{6-12}$ arylazo group, halogen atom, $C_{1-12}$ alkyl group, nitro group, and trifluoromethyl group. Examples of such a substituted aryl group include hydroxyphenyl group, alkoxyphenyl group (e.g., methoxyphenyl, ethoxyphenyl), cyanophenyl group, aminophenyl group, (alkylamino)phenyl group (e.g., (methylamino)phenyl, (ethylamino)phenyl), (dialkylamino)phenyl group (e.g., (dimethylamino)phenyl), (diethylamino)phenyl), halogenophenyl group (e.g., fluorophenyl, chlorophenyl, bromophenyl), alkylphenyl group (e.g., tolyl, ethylphenyl, cumenyl, xylyl, mesityl), nitrophenyl group, trifluoromethylphenyl group, and phenyl group containing two or three such substituents (which may be the same or different). These substituents may substitute at any positions.

Examples of the group represented by $R^2$ include a hydrogen atom, $C_{1-6}$ lower alkyl group, carbamoyl group, carboxyl group, alkoxycarbonyl group containing $C_{1-12}$ alkoxy group, aryloxycarbonyl group containing $C_{6-20}$ aryloxy group, and substituted or unsubstituted amino group.

If $R^2$ is a substituted amino group, specific examples of such a substituted amino group include a methylamino group, ethylamino group, propylamino group, phenylamino group, tolylamino group, benzylamino group, diethylamino group, and diphenylamino group.

If $R^2$ is a lower alkyl group, specific examples of such a lower alkyl group include a methyl group ethyl group, propyl group, butyl group, isopropyl group, and isobutyl group.

If $R^2$ is an alkoxycarbonyl group, specific examples of such an alkoxycarbonyl group include a methoxycarbonyl group, ethoxycarbonyl group, propoxycarbonyl group, butoxycarbonyl group, isopropoxycarbonyl group, and benzyloxycarbonyl group.

If $R^2$ is an aryloxycarbonyl group, specific examples of such an aryloxycarbonyl group include phenoxycarbonyl group and toluoxycarbonyl group.

Examples of the group represented by $R^3$ include a $C_{1-20}$ alkyl group, a $C_{6-24}$ aromatic hydrocarbon group such as phenyl group and naphthyl group, an aromatic heterocyclclic group such as dibenzofuranyl group, carbazolyl group and dibenzocarbazolyl group, and compounds obtained by substituting these groups with substituents. The aromatic heterocyclic group is $C_{6-24}$ 5- to 8-membered one containing 1 to 3 hetero atom(s) (e.g., N, S, O).

If $R^3$ is a substituted or unsubstituted alkyl group, specific examples of such a substituted or unsubstituted alkyl group include those described with reference to the substituted or unsubstituted alkyl group represented by $R^1$.

If $R^3$ is an aromatic hydrocarbon group or aromatic heterocyclic group containing substituents, specific examples of substituents which can be contained in such a substituted aromatic hydrocarbon or aromatic heterocyclic group include a hydroxyl group, cyan group, nitro group, halogen atom (e.g., fluorine, chlorine, bromine), $C_{1-18}$ alkyl group (e.g., methyl, ethyl, propyl, isopropyl), $C_{1-12}$ alkoxy group (e.g., methoxy, ethoxy, propoxy, butoxy, pentyloxy, isopropoxy, isobutoxy, isoamyloxy, tert-butoxy, neopentyloxy), trifluoromethyl group, trimethylsilyl group, methanesulfonyl group, amino group, $C_{1-12}$ alkylamino group (e.g., methylamino, ethylamino, propylamino), $C_{1-12}$ dialkylamino group (e.g., dimethylamino, diethylamino, N-methyl-N-ethylamino), $C_{6-12}$ arylamino group (e.g., phenylamino, tolylamino), diarylamino group containing two $C_{6-15}$ aryl groups (e.g., diphenylamino), $C_{6-12}$ arylazo group (e.g., phenylazo, chlorophenylazo, fluorophenylazo, bromophenylazo, cyanophenylazo, ethoxycarbonylphenylazo, nitrophenylazo, acetamiophenylazo, methoxyphenylazo, methylphenylphenylazo, n-octyl-phenylazo, trifluoromethylphenylazo, trimethylsilylphenylazo, methanesulfonylazo), carboxyl group, alkoxycarbonyl group containing $C_{1-18}$ alkoxy groups (e.g., methoxycarbonyl, ethoxycarbonyl), aryloxycarbonyl group containing $C_{6-16}$ aryloxy groups (e.g., phenoxycarbonyl, naphthoxycarbonyl), carboxylate of alkaline metal (examples of alkaline metal cations include $Na\oplus$, $K\oplus$ and $Li\oplus$), sulfonate of alkaline metal (examples of alkaline metal cations include $Na\oplus$, $K\oplus$ and $Li\oplus$), alkylcarbonyl group (e.g., acetyl, propionyl, benzylcarbonyl), arylcarbonyl group containing $C_{6-12}$ aryl group (e.g., benzoyl, toluole), $C_{1-12}$ alkylthio group (e.g., methylthio, ethylthio), and $C_{1-12}$ arylthio group (e.g., phenylthio, tolylthio). The aromatic hydrocarbon or aromatic heterocyclic group can contain 1 to 5 such substituents. If a plurality of such substituents are connected to the aromatic hydrocarbon or aromatic heterocyclic group, they may be the same or different. These substituents may substitute at any position.

Examples of the group represented by $R^4$ include hydrogen atom and those described with reference to $R^3$.

If Y represents an unsubstituted 5- or 6-membered heterocyclic group, specific examples of such an unsubstituted 5- or 6-membered heterocyclic group include imidazole ring, oxazole ring, thiazole ring, benzoimidazole ring, benzothiazole ring, benzoxazole ring, pyrimidine ring, and perimidine ring. If Y represents a 5- or 6-membered heterocyclic group containing substituents, specific examples of such substituents include those described with reference to R³ wherein R³ is an aromatic hydrocarbon group containing substituents.

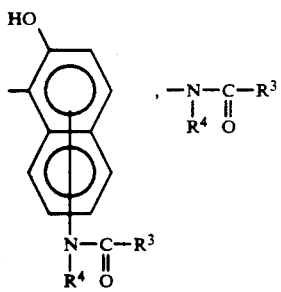

can substitute at the 3- to 8-position, preferably the 8-position, of the naphthalene ring.

B represents a divalent $C_{6-14}$ aromatic hydrocarbon group or $C_{4-14}$ heterocyclic group (containing 1 to 6 hetero atoms, e.g., N, O, S) which may be substituted by an alkyl group, halogen atom, nitro group, trifluoromethyl group, cyano group or hydroxy group. Examples of such a divalent aromatic hydrocarbon group include an o-phenylene group, o-naphthylene group, peri-naphthylene group, 1,2-anthraquinonylene group, and 9,10-phenanthrylene group. As a heterocyclic group, a nitrogen-containing heterocyclic group is preferred. Examples of such a nitrogen-containing heterocyclic group include 3,4-pyrazolediil group, 2,3-pyridiil group, 4,5-pyrimidinediil group, 6,7-indazolediil group, 5,6-benzimidazolediil group, and 6,7-quinolinediil group.

Specific examples of the bisazo compounds represented by the general formulae (1-A), (1-B) and (1-C) will be set forth in Tables 1-A, 1-B and 1-c below, but the present invention should not be construed as being limited thereto. In specific examples of bisazo compounds represented by the general formulae (I'-A), (I'-B) and (I'-C), Cp' indicates a coupler residue set forth in Tables 2, 3 and 4.

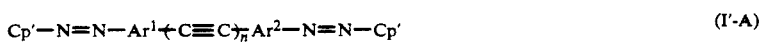 (I'-A)

 (I'-B)

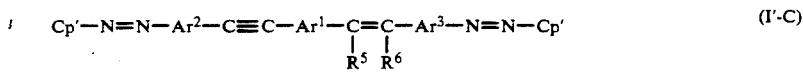 (I'-C)

TABLE 1-A

| Compound Group No. | Ar¹ | Ar² | n |
|---|---|---|---|
| (1) | ⟨phenylene⟩ | ⟨phenylene⟩ | 2 |
| (2) | ⟨phenylene⟩ | ⟨phenylene⟩ | 3 |
| (3) | ⟨phenylene⟩ | ⟨phenylene⟩ | 2 |
| (4) | ⟨phenylene⟩ | ⟨phenylene⟩ | 3 |
| (5) | ⟨phenylene⟩ | ⟨phenylene⟩ | 2 |
| (6) | ⟨phenylene⟩ | ⟨phenylene⟩ | 3 |

TABLE 1-A-continued

| Compound Group No. | Ar¹ | Ar² | n |
|---|---|---|---|
| (7) | naphthalene-2,3-diyl | 1,4-phenylene | 2 |
| (8) | naphthalene-2,3-diyl | 1,3-phenylene | 2 |
| (9) | naphthalene-1,5-diyl | 1,4-phenylene | 2 |
| (10) | naphthalene-2,6-diyl | 1,4-phenylene | 2 |
| (11) | naphthalene-2,7-diyl | 1,4-phenylene | 2 |
| (12) | anthracene-2,6-diyl | 1,4-phenylene | 2 |
| (13) | 2,5-dichloro-1,4-phenylene | 1,4-phenylene | 2 |

TABLE 1-A-continued
| Compound Group No. | Ar¹ | Ar² | n |
|---|---|---|---|
| (14) | 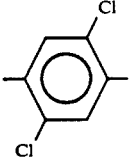 | 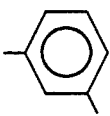 | 2 |
| (15) |  |  | 2 |
| (16) | 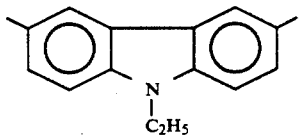 |  | 2 |
| (17) | 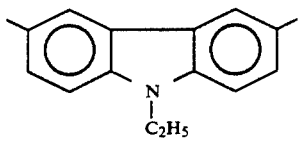 | 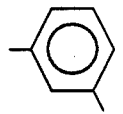 | 2 |
| (18) | 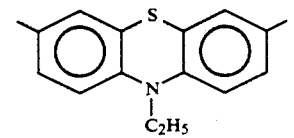 |  | 2 |
| (19) | 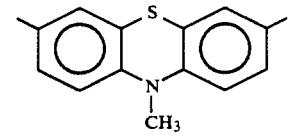 |  | 2 |
| (20) |  |  | 2 |
| (21) | 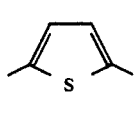 | 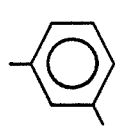 | 2 |
| (22) | 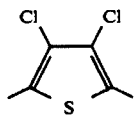 | 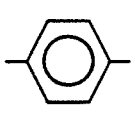 | 2 |
| (23) | 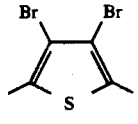 | 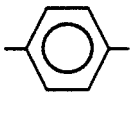 | 2 |
| (24) | 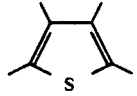 |  | 2 |

TABLE 1-A-continued

| Compound Group No. | Ar¹ | Ar² | n |
|---|---|---|---|
| (25) | dibenzothiophene-2,8-diyl | phenylene | 2 |
| (26) | fluorene-2,7-diyl | phenylene | 2 |
| (27) | fluorenone-2,7-diyl | phenylene | 2 |
| (28) | benzoxazole-2,6-diyl | phenylene | 2 |
| (29) | thiophene-2,5-diyl | thiophene-2,5-diyl | 2 |
| (30) | naphthalene-2,6-diyl | naphthalene-2,6-diyl | 2 |
| (31) | 4-(N,N-dimethylamino)phenylene | phenylene | 2 |
| (32) | 4-(N,N-dimethylamino)phenylene | phenylene | 2 |
| (33) | phenylene | phenylene | 2 |
| (34) | phenylene | phenylene | 2 |

TABLE 1-A-continued

| Compound Group No. | Ar¹ | Ar² | n |
|---|---|---|---|
| (35) | 4-(N,N-diphenylamino)phenyl | 1,4-phenylene | 2 |
| (36) | 4-(N,N-dimethylamino)phenyl | 4-(N,N-dimethylamino)phenyl | 2 |

TABLE 1-B

| Compound Group No. | Ar¹ | Ar² | Ar³ | Ar⁴ |
|---|---|---|---|---|
| (1) | 1,4-phenylene | 1,4-phenylene | 1,4-phenylene | 1,4-phenylene |
| (2) | 1,4-phenylene | methyl-phenylene | methyl-phenylene | 1,4-phenylene |
| (3) | 1,4-phenylene | methyl-phenylene | methyl-phenylene | methyl-phenylene |
| (4) | methyl-phenylene | 1,4-phenylene | 1,4-phenylene | methyl-phenylene |
| (5) | dimethyl-phenylene | 1,4-phenylene | 1,4-phenylene | dimethyl-phenylene |
| (6) | methyl-phenylene | methyl-phenylene | methyl-phenylene | methyl-phenylene |
| (7) | methyl-phenylene | methyl-phenylene | methyl-phenylene | methyl-phenylene |
| (8) | methyl-phenylene | methyl-phenylene | methyl-phenylene | methyl-phenylene |

TABLE 1-B-continued
| Compound Group No. | Ar¹ | Ar² | Ar³ | Ar⁴ |
|---|---|---|---|---|
| (9) | 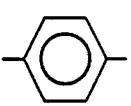 | 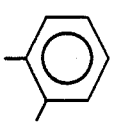 | 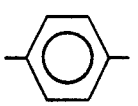 | 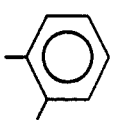 |
| (10) | 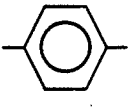 | 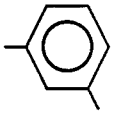 | 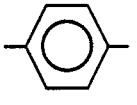 | 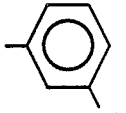 |
| (11) | 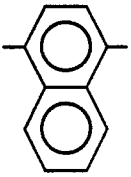 | 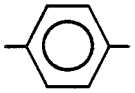 | 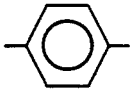 | 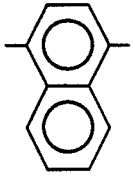 |
| (12) |  | 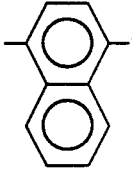 | 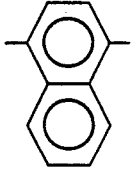 | 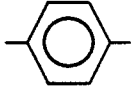 |
| (13) |  | 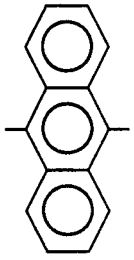 | 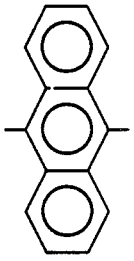 | 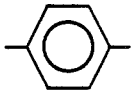 |
| (14) |  | 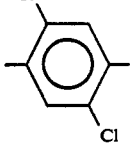 | 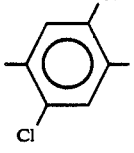 | 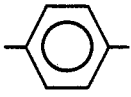 |
| (15) |  |  |  | 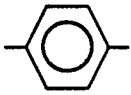 |
| (16) | 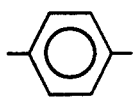 | 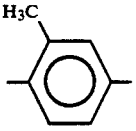 | 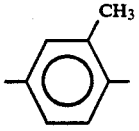 | 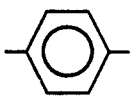 |
| (17) | 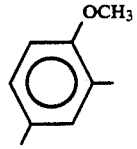 |  |  | 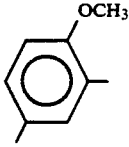 |

TABLE 1-B-continued
| Compound Group No. | Ar¹ | Ar² | Ar³ | Ar⁴ |
|---|---|---|---|---|
| (18) |  | 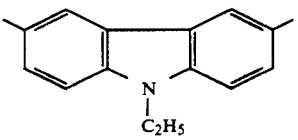 | 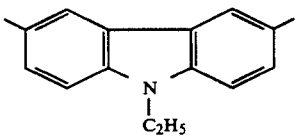 |  |
| (19) |  | 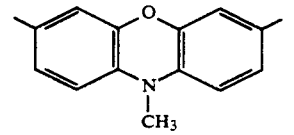 | 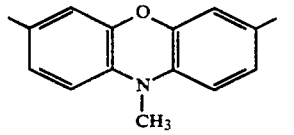 |  |
| (20) |  | 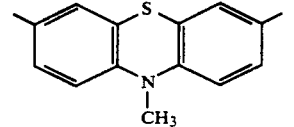 | 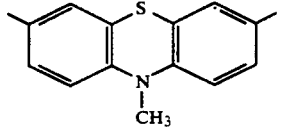 |  |
| (21) |  |  | 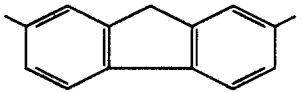 |  |
| (22) |  |  |  |  |
| (23) |  |  |  |  |
| (24) | 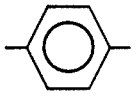 | 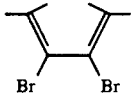 | 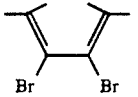 |  |
| (25) | 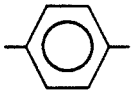 | 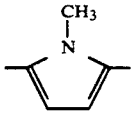 | 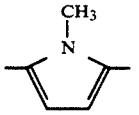 |  |
| (26) | 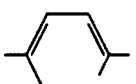 |  | 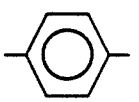 | 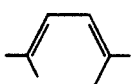 |
| (27) | 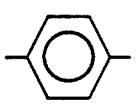 |  | 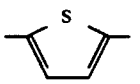 | 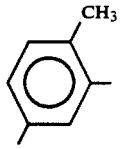 |
| (28) | 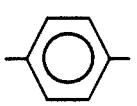 | 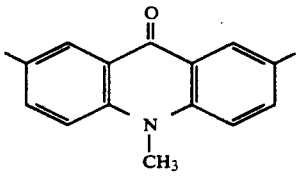 | 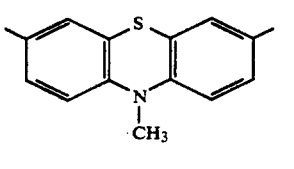 | 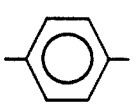 |

TABLE 1-B-continued

| Compound Group No. | Ar¹ | Ar² | Ar³ | Ar⁴ |
|---|---|---|---|---|
| (29) | (2,5-dimethylphenyl) | dibenzothiophene-diyl (with methyl substituents) | (1,4-phenylene) | (2,5-dimethylphenyl) |

TABLE 1-C

| Compound Group No. | Ar¹ | Ar² | Ar³ | $R^5$ | $R^6$ |
|---|---|---|---|---|---|
| (1) | 1,4-phenylene | 1,4-phenylene | 1,4-phenylene | H | H |
| (2) | 1,4-phenylene | 1,3-phenylene (methyl-substituted) | 1,4-phenylene | H | H |
| (3) | 1,4-phenylene | 1,4-phenylene | 1,3-phenylene (methyl-substituted) | H | H |
| (4) | 1,3-phenylene (methyl-substituted) | 1,4-phenylene | 1,4-phenylene | H | H |
| (5) | 1,2-phenylene (methyl-substituted) | 1,4-phenylene | 1,4-phenylene | H | H |
| (6) | 2,6-naphthylene | 1,4-phenylene | 1,4-phenylene | H | H |
| (7) | 2,6-naphthylene | 1,3-phenylene (methyl-substituted) | 1,4-phenylene | H | H |
| (8) | 2,6-naphthylene | 1,4-phenylene | 1,4-phenylene | H | H |

TABLE 1-C-continued

| Compound Group No. | Ar¹ | Ar² | Ar³ | $R^5$ | $R^6$ |
|---|---|---|---|---|---|
| (9) | naphthalene-2,6-diyl | phenylene | phenylene | H | H |
| (10) | naphthalene-2,3-diyl | phenylene | phenylene | H | H |
| (11) | anthracene-2,6-diyl | phenylene | phenylene | H | H |
| (12) | 2,5-dichlorophenylene | phenylene | phenylene | H | H |
| (13) | 2,5-dichlorophenylene | methylphenylene | phenylene | H | H |
| (14) | biphenyl-4,4'-diyl | phenylene | phenylene | H | H |
| (15) | 9-ethylcarbazole-2,7-diyl | phenylene | phenylene | H | H |
| (16) | 9-ethylcarbazole-2,7-diyl | methylphenylene | phenylene | H | H |

TABLE 1-C-continued

| Compound Group No. | Ar¹ | Ar² | Ar³ | R⁵ | R⁶ |
|---|---|---|---|---|---|
| (17) | 3,7-disubstituted 10-ethyl phenothiazine | p-phenylene | p-phenylene | H | H |
| (18) | 3,7-disubstituted 10-methyl phenothiazine | p-phenylene | p-phenylene | H | H |
| (19) | 2,5-thiophene | p-phenylene | p-phenylene | H | H |
| (20) | 2,5-thiophene | p-phenylene | p-phenylene | H | H |
| (21) | 3,4-dichloro-2,5-thiophene | p-phenylene | p-phenylene | H | H |
| (22) | 3,4-dibromo-2,5-thiophene | p-phenylene | p-phenylene | H | H |
| (23) | 3,4-diphenyl-2,5-thiophene | p-phenylene | m-phenylene | H | H |
| (24) | dibenzothiophene-3,7-diyl | p-phenylene | p-phenylene | H | H |
| (25) | fluorene-2,7-diyl | p-phenylene | p-phenylene | H | H |
| (26) | fluorenone-2,7-diyl | p-phenylene | p-phenylene | H | H |
| (27) | benzoxazole-2,6-diyl | p-phenylene | p-phenylene | H | H |

TABLE 1-C-continued
| Compound Group No. | Ar¹ | Ar² | Ar³ | R⁵ | R⁶ |
|---|---|---|---|---|---|
| (28) | azulenyl | phenyl | phenyl | H | H |
| (29) | azulenyl | dimethylphenyl | dimethylphenyl | H | H |
| (30) | phenyl | thienyl (S) | phenyl | H | H |
| (31) | phenyl | phenyl | phenyl | H | —CN |
| (32) | naphthyl | phenyl | phenyl | H | —CN |
| (33) | naphthyl | phenyl | phenyl | —OCH₃ | —H |
| (34) | thienyl (S) | thienyl (S) | thienyl (S) | H | H |
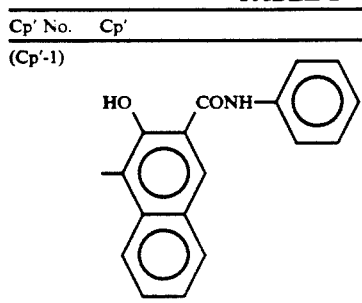
TABLE 2
Cp' No.  Cp'
(Cp'-1)
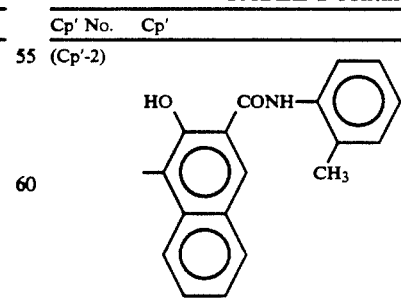
TABLE 2-continued
Cp' No.  Cp'
(Cp'-2)

TABLE 2-continued

| Cp' No. | Cp' |
|---|---|
| (Cp'-3) | 2-hydroxy-3-methyl-N-(4-methoxyphenyl)-naphthamide |
| (Cp'-4) | 2-hydroxy-3-methyl-N-(4-chlorophenyl)-naphthamide |
| (Cp'-5) | 2-hydroxy-3-methyl-N-(3-nitrophenyl)-naphthamide |
| (Cp'-6) | 2-hydroxy-3-methyl-N-(2-ethoxyphenyl)-naphthamide |
| (Cp'-7) | 2-hydroxy-3-methyl-N-(4-methylphenyl)-naphthamide |
| (Cp'-8) | 2-hydroxy-3-methyl-N-(3-chlorophenyl)-naphthamide |
| (Cp'-9) | 2-hydroxy-3-methyl-N-(4-ethoxyphenyl)-naphthamide |
| (Cp'-10) | 2-hydroxy-3-methyl-N-(4-chloro-2-methylphenyl)-naphthamide |
| (Cp'-11) | 2-hydroxy-3-methyl-N-(5-chloro-2-methylphenyl)-naphthamide |
| (Cp'-12) | 2-hydroxy-3-methyl-N-(2,4-dimethylphenyl)-naphthamide |
| (Cp'-13) | 2-hydroxy-3-methyl-N-(5-chloro-2-methoxyphenyl)-naphthamide |

TABLE 2-continued

| Cp' No. | Cp' |
|---|---|
| (Cp'-14) | 2-hydroxy-3-methyl-N-(2,5-dimethoxyphenyl)-naphthamide |
| (Cp'-15) | 2-hydroxy-3-methyl-N-(4-chloro-2,5-dimethoxyphenyl)-naphthamide |
| (Cp'-16) | 2-hydroxy-3-methyl-N-(5-chloro-2,4-dimethoxyphenyl)-naphthamide |
| (Cp'-17) | 2-hydroxy-3-methyl-N-(1-naphthyl)-naphthamide |
| (Cp'-18) | 2-hydroxy-3-methyl-N-(2-naphthyl)-naphthamide |
| (Cp'-19) | 2-hydroxy-3-methyl-N-(2-methoxyphenyl)-naphthamide |
| (Cp'-20) | 2-hydroxy-3-methyl-N-(2-methylphenyl)-naphthamide |
| (Cp'-21) | (benzocarbazole with 4-methoxyanilide) |
| (Cp'-22) | (benzocarbazole with 4-methoxy-2-methylanilide) |
| (Cp'-23) | 2-hydroxy-3-methyl-N-methyl-N-phenyl-naphthamide |

TABLE 2-continued

| Cp' No. | Cp' |
|---|---|
| (Cp'-24) | [structure: 3-hydroxy-methylnaphthalene with CON(phenyl)$_2$] |
| (Cp'-25) | [structure: hydroxy-methyl naphthalimide with N—CH$_3$] |
| (Cp'-26) | [structure: hydroxy-methyl naphthalimide with N-(4-chlorophenyl)] |
| (Cp'-27) | [structure: hydroxy-methyl naphthalimide with N—CH$_3$] |
| (Cp'-28) | [structure: hydroxy-methyl naphthalimide with N—C$_2$H$_5$] |
| (Cp'-29) | [structure: hydroxy-methyl naphthalimide with N-phenyl] |
| (Cp'-30) | [structure: hydroxy-methyl naphthalimide with N-(4-(phenylazo)phenyl)] |
| (Cp'-31) | [structure: hydroxy-methylnaphthyl-NHCO-phenyl] |
| (Cp'-32) | [structure: hydroxy-methylnaphthyl-NHCO-(4-chlorophenyl)] |
| (Cp'-33) | [structure: 3-methyl-4-methyl-5-hydroxy-1-phenylpyrazole] |
| (Cp'-34) | [structure: 3-methyl-4-methyl-5-hydroxy-1-(4-chlorophenyl)pyrazole] |
| (Cp'-35) | —CHCONH—phenyl<br>      |<br>    COCH$_3$ |
| (Cp'-36) | —CHCONH—naphthyl<br>      |<br>    COCH$_3$ |

TABLE 3
| | Ar | | | |
|---|---|---|---|---|
| | 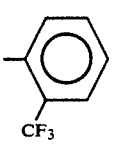 2-CF₃-phenyl | 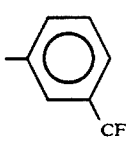 3-CF₃-phenyl | 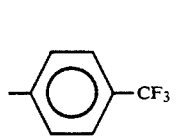 4-CF₃-phenyl | 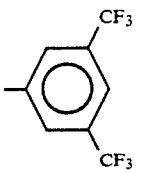 3,5-bis(CF₃)-phenyl |
| 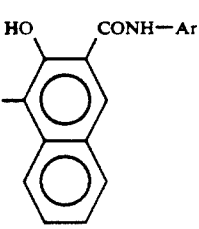 HO—CONH—Ar | Cp'-37 | Cp'-38 | Cp'-39 | Cp'-40 |
| 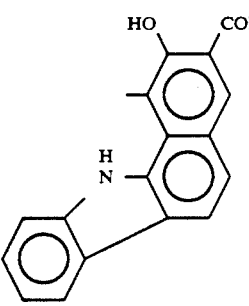 HO—CONH—Ar | Cp'-49 | Cp'-50 | Cp'-51 | Cp'-52 |
| 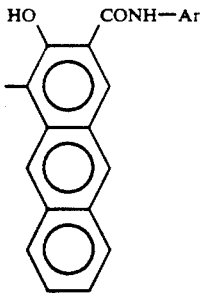 HO—CONH—Ar | Cp'-61 | Cp'-62 | Cp'-63 | Cp'-64 |
| 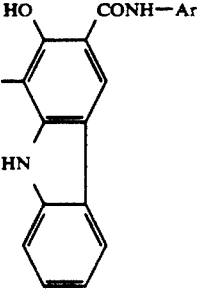 HO—CONH—Ar | Cp'-73 | Cp'-74 | Cp'-75 | Cp'-76 |

TABLE 3-continued
| | Ar | | | |
|---|---|---|---|---|
| | Cp'-85 | Cp'-86 | Cp'-87 | Cp'-88 |
| 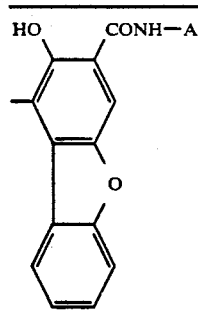 | | | | |
| | 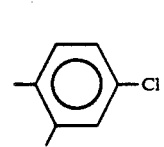 | 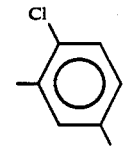 | 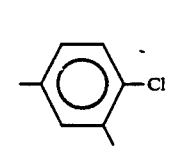 | 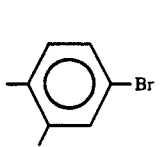 |
| 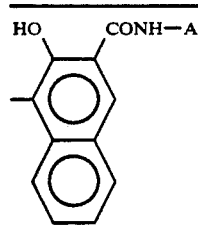 | Cp'-41 | Cp'-42 | Cp'-43 | Cp'-44 |
| 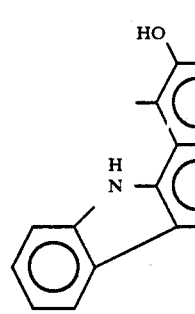 | Cp'-53 | Cp'-54 | Cp'-55 | Cp'-56 |
| 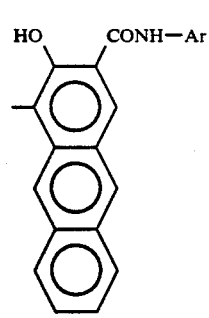 | Cp'-65 | Cp'-66 | Cp'-67 | Cp'-68 |
| 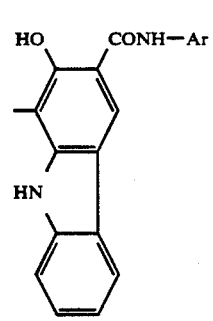 | Cp'-77 | Cp'-78 | Cp'-79 | Cp'-80 |

TABLE 3-continued

| Ar coupler structure | | Ar = 4-Br-2-Me-C6H3-CF3 (4-CF3) | Ar = 2-Me-4-CF3-C6H3 with F | Ar = 2-F-4-CF3 with F variant | Ar = 2-Me-4-CF3 alt | Ar = 2-C2H5-C6H4 |
|---|---|---|---|---|---|---|
| HO-dibenzofuran-CONH-Ar | | Cp'-89 | Cp'-90 | Cp'-91 | Cp'-92 | |
| 3-hydroxy-naphthamide (HO, CONH-Ar) | | Cp'-45 | Cp'-46 | Cp'-47 | Cp'-48 | Cp'-97 |
| carbazole-naphthamide | | Cp'-57 | Cp'-58 | Cp'-59 | Cp'-60 | Cp'-109 |
| 3-hydroxy-anthracene-carboxamide | | Cp'-69 | Cp'-70 | Cp'-71 | Cp'-72 | Cp'-121 |

TABLE 3-continued
| | Ar | | | | |
|---|---|---|---|---|---|
|  | Cp'-81 | Cp'-82 | Cp'-83 | Cp'-84 | Cp'-133 |
|  | Cp'-93 | Cp'-94 | Cp'-95 | Cp'-96 | Cp'-145 |
| | 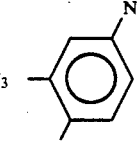 |  | | 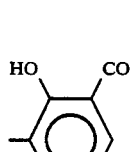 | 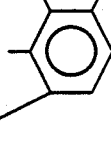 |
| 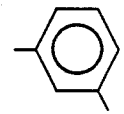 | Cp'-98 | Cp'-99 | | Cp'-100 | Cp'-101 |
| 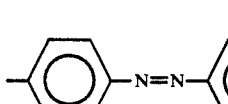 | Cp'-110 | Cp'-111 | | Cp'-112 | Cp'-113 |
| 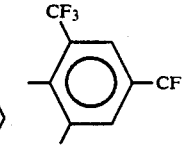 | Cp'-122 | Cp'-123 | | Cp'-124 | Cp'-125 |

TABLE 3-continued

| | Ar | | | |
|---|---|---|---|---|
| [structure: HO-C6H2(CONH-Ar)-CH3 with carbazole fused via NH] | Cp'-134 | Cp'-135 | Cp'-136 | Cp'-137 |
| [structure: HO-C6H2(CONH-Ar)-CH3 with dibenzofuran] | Cp'-146 | Cp'-147 | Cp'-148 | Cp'-149 |
| | [Ar: 4-CH3, 3-CF3, OCH3-phenyl] | [Ar: NEt2-phenyl with CF3] | [Ar: CO2CH3-phenyl with CF3] | [Ar: CF3-phenyl with CH3] |
| [structure: 3-hydroxy-2-naphthamide] | Cp'-102 | Cp'-103 | Cp'-104 | Cp'-105 |
| [structure: HO-CONH-Ar with indole-fused naphthalene] | Cp'-114 | Cp'-115 | Cp'-116 | Cp'-117 |

TABLE 3-continued
| | Ar | | | |
|---|---|---|---|---|
| 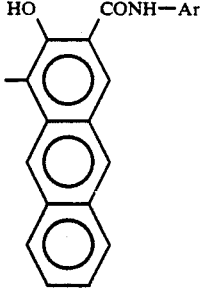 | Cp'-126 | Cp'-127 | Cp'-128 | Cp'-129 |
| 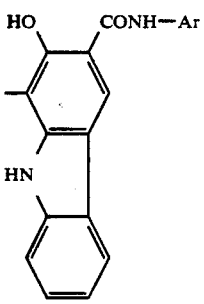 | Cp'-138 | Cp'-139 | Cp'-140 | Cp'-141 |
| 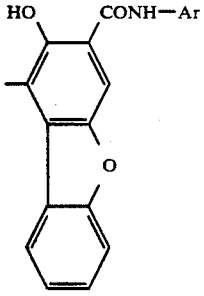 | Cp'-150 | Cp'-151 | Cp'-152 | Cp'-153 |
| | 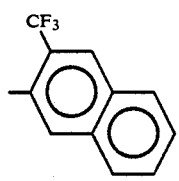 | 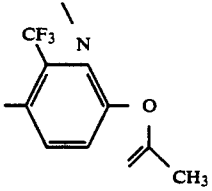 | 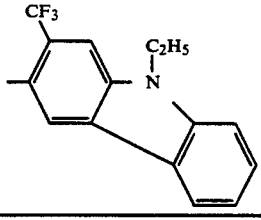 | |
| 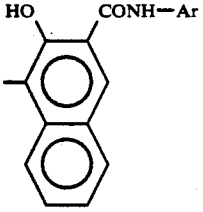 | Cp'-106 | Cp'-107 | Cp'-108 | |

TABLE 3-continued

| | Ar | | |
|---|---|---|---|
| [structure: 3-hydroxy-2-methyl naphthalene with CONH-Ar and fused indole/NH] | Cp'-118 | Cp'-119 | Cp'-120 |
| [structure: HO, CONH-Ar substituted anthracene with methyl] | Cp'-130 | Cp'-131 | Cp'-132 |
| [structure: HO, CONH-Ar phenyl with HN-linked phenyl (carbazole-like)] | Cp'-142 | Cp'-143 | Cp'-144 |
| [structure: HO, CONH-Ar phenyl with O-linked phenyl (dibenzofuran-like)] | Cp'-154 | Cp'-155 | Cp'-156 |

TABLE 4

| Cp' No. | Cp' |
|---|---|
| (Cp'-157) | 3-hydroxy-2-naphthamide with N=C(phenyl)(4-chlorophenyl) |
| (Cp'-158) | 3-hydroxy-2-naphthamide with N=CH(3-methylphenyl) |
| (Cp'-159) | 3-hydroxy-2-naphthamide with N=C(CH₃)(phenyl) |
| (Cp'-160) | 3-hydroxy-2-naphthamide with N=C(phenyl)(4-pyridyl) |
| (Cp'-161) | 3-hydroxy-2-naphthamide with N=C(phenyl)(1-naphthyl) |
| (Cp'-162) | 3-hydroxy-2-naphthamide with N=C(phenyl)(9-ethylcarbazol-3-yl) |
| (Cp'-163) | 3-hydroxy-2-naphthamide with N=C(phenyl)(phenyl) |
| (Cp'-164) | 3-hydroxy-2-naphthamide with N=C(CH₂OCH₃)(phenyl) |
| (Cp'-165) | 3-hydroxy-2-naphthamide with N=C(CH₂Cl)(phenyl) |
| (Cp'-166) | 3-hydroxy-2-naphthamide with N=C(2,4-dimethoxyphenyl)(phenyl) |

TABLE 4-continued

| Cp' No. | Cp' |
|---|---|
| (Cp'-167) | [structure: benzimidazole-fused naphthalenone with OH] |
| (Cp'-168) | [structure: 4-methylphenyl benzimidazole-fused naphthalenone with OH] |
| (Cp'-169) | [structure: 3,4-dimethylphenyl benzimidazole-fused naphthalenone with OH] |
| (Cp'-170) | [structure: naphtho-fused benzimidazole naphthalenone with OH] |
| (Cp'-171) | [structure: 4-chlorophenyl benzimidazole-fused naphthalenone with OH] |
| (Cp'-172) | [structure: 4-nitrophenyl benzimidazole-fused naphthalenone with OH] |
| (Cp'-173) | [structure: naphthyl benzimidazole-fused naphthalenone with OH] |
| (Cp'-174) | [structure: 4-hydroxyphenyl benzimidazole-fused naphthalenone with OH] |

TABLE 4-continued

| Cp' No. | Cp' |
|---|---|
| (Cp'-175) | [structure: naphthalene fused imidazole ring with pyridin-2-yl substituent, C=O, OH, CH₃] |
| (Cp'-176) | [structure: naphthalene fused imidazole with pyrimidin-4-yl substituent, C=O, OH, CH₃] |
| (Cp'-177) | [structure: naphthalene fused imidazole with quinolin-6-yl substituent, C=O, OH, CH₃] |
| (Cp'-178) | [structure: naphthalene fused imidazole with phenyl substituent, C=O, OH, CH₃] |
| (Cp'-179) | [structure: naphthalene fused imidazole with 4-methylphenyl substituent, C=O, OH, CH₃] |
| (Cp'-180) | [structure: naphthalene fused imidazole with 3,4-dimethylphenyl substituent, C=O, OH, CH₃] |
| (Cp'-181) | [structure: naphthalene fused imidazole with naphthyl substituent, C=O, OH, CH₃] |
| (Cp'-182) | [structure: naphthalene fused imidazole with 4-chlorophenyl substituent, C=O, OH, CH₃] |

TABLE 4-continued

| Cp' No. | Cp' |
|---|---|
| (Cp'-183) | 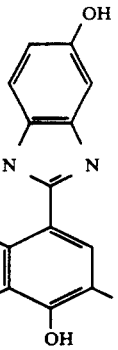 |
| (Cp'-184) | 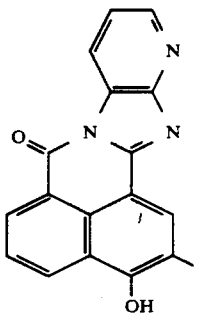 |

The synthesis of the novel bisazo compound of the present invention represented by the general formulae (1-A), (1-B) and (1-C) can be easily accomplished by the following method. Specifically, a diamino compound represented by the general formula (2-A), (2 B) or (2-C) is allowed to undergo tetraazodization in an ordinary method. The tetraazo salt is then allowed to undergo coupling with the corresponding coupler in the presence of an alkali. Alternatively, the tetrazonium salt is isolated in the form of borofluoride or zinc chloride double salt, and then allowed to undergo coupling with the coupler in a solvent such as N,N-dimethylformamide and dimethylsulfoxide in the presence of an alkali.

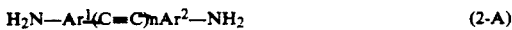     (2-A)

wherein $Ar^1$ and $Ar^2$ are as defined in general formula (1-A).

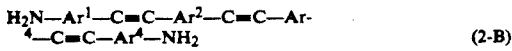     (2-B)

wherein $Ar^1$, $Ar^2$, $Ar^3$ and $Ar^4$ are as defined in general formula (1-B).

     (2-C)

wherein $Ar^1$, $Ar^2$, $Ar^3$, $R^5$ and $R^6$ are as defined in the general formula (1-C).

SYNTHESIS EXAMPLE A

Synthesis of a bisazo compound of Compound Group (1) in Table 1-A wherein the coupler is (Cp'-21)

2.32 g (0.01 m mol) of a diamino compound represented by the following structural formula (3-A) was added to dilute hydrochloric acid prepared from 25 ml of concentrated hydrochloric acid and 30 ml of water. The mixture was then stirred on a water bath of 60° C. over about 30 minutes. The mixture was then cooled to a temperature of 0° C. A solution of 1.52 g of sodium nitrite in 5 ml of water was added dropwise to the mixture over about 20 minutes. The mixture was then stirred at the same temperature over 1 hour. A small amount of unreacted materials were filtered out. The filtrate was then added dropwise to a solution prepared from 7.65 g (0.02 mol) of Coupler (Cp'-21), 3.28 g of sodium acetate, 20 ml of water and 300 ml of DMF in a separate vessel with stirring while being cooled with ice. The material was stirred at room temperature over 2 hours. The resulting crystals were filtered off, and washed with water and with acetone. This process was repeated for purification. As a result, 8.7 g of black powder of the desired bisazo was obtained. (Yield: 85%; decomposition temperature: 270° C. or higher)

Elementary analysis: Calculated % for $C_{64}H_{42}N_8O_6$: C75.43, H4.11, N11.00. Found %: C75.23, H4.11, N10.75.

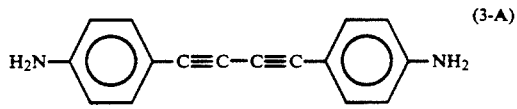     (3-A)

SYNTHESIS EXAMPLE B

Synthesis of a bisazo compound of Compound Group No. 1 in Table 1-B wherein the coupler is (Cp'-21)

4.08 g (0.01 m mol) of a diamino compound represented by the structural formula (3-B) was added to dilute hydrochloric acid prepared from 25 ml of concentrated hydrochloric acid and 30 ml of water. The mixture was then stirred on a water bath of 60° C. over about 30 minutes. The mixture was then cooled to a temperature of 0° C. A solution of 1.38 g of sodium nitrite in 10 ml of water was added dropwise to the material over about 20 minutes. The mixture was then stirred at the same temperature over 1 hour. A small amount of unreacted materials were filtered out. The filtrate was then added dropwise to a solution prepared from 8.42 g (0.02 mol) of Coupler (Cp'-21), 3.28 g of sodium acetate, 10 ml of water and 300 ml of DMF in a separate vessel with stirring while being cooled with ice. The material was stirred at room temperature over 2 hours. The resulting crystals were filtered off, and washed with water and with acetone. This process was repeated for purification. As a result, 10.5 g of black powder of the desired bisazo compound was obtained. (Yield: 88%; decomposition temperature: 270° C. or higher)

Elementary analysis: Calculated % for $C_{78}H_{52}N_8O_6$ C78.25, H4.38, N9.36, . Found %: C78.04, H4.39, N9.33.

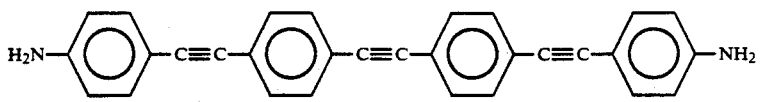

(3-B)

SYNTHESIS EXAMPLE C

Synthesis of a bisazo compound of Compound Group No. 1 in Table 1-C wherein the coupler is (Cp'-21)

3.12 g (0.01 m mol) of the diamino compound represented by the structural formula (3-C) was added to dilute hydrochloric acid prepared from 25 ml of concentrated hydrochloric acid and 30 ml of water. The mixture was then stirred on a water bath of 60° C. over about 30 minutes. The mixture was then cooled to a temperature of 0° C. A solution of 1.52 9 of sodium nitrite in 5 ml of water was added dropwise to the material over about 20 minutes. The mixture was then stirred at the same temperature over 1 hour. A small amount of unreacted materials were filtered out. The filtrate was then added dropwise to a solution prepared from 7.65 g (0.02 mol) of Coupler (Cp'-21), 3.28 g of sodium acetate, 20 ml of water and 300 ml of DMF in a separate vessel with stirring while being cooled with ice. The material was stirred at room temperature over hours. The resulting crystals were filtered off, and washed with water and with acetone. This process was repeated for purification. As a result, 9.1 g of black powder of the desired bisazo compound was obtained. (Yield: 83%; decomposition temperature: 270° C. or higher)

Elementary analysis: Calculated % for $C_{70}H_{48}N_8O_6$ C76.63, H4.41, N10.21. Found %: C76.36, H4.48, N10.03.

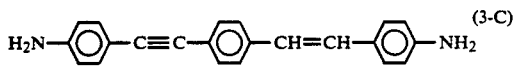

(3-C)

The electrophotographic photoreceptor of the present invention comprises an electrophotographic light-sensitive layer containing one or two bisazo compounds represented by the general formula (1-A), (1-B) or (1-C). Various forms of electrophotographic photoreceptors have been known. The electrophotographic photoreceptor of the present invention may be in any of these forms but normally has an electrophotographic photoreceptor structure of any of the following types (I), (II) and (III):

(I) A structure comprising on an electrically conductive support an electrophotographic light-sensitive layer with a bisazo compound dispersed in a binder or charge carrier-transporting medium;

(II) A structure comprising or: an electrically conductive support a charge carrier-generating layer containing a bisazo compound as a main component and a charge carrier-transporting layer provided thereon; and (III) A structure comprising on an electrically conductive support a charge carrier-transporting layer and a charge carrier-generating layer containing a bisazo compound as a main component provided thereon.

The bisazo compound of the present invention has an effect of producing a charge carrier at an extremely high efficiency upon absorption of light. The charge carrier thus produced is transported by a charge carrier transporting compound.

The preparation of an electrophotographic photoreceptor of Type (I) can be accomplished by dispersing finely divided grains of a bisazo compound in a binder solution or a solution containing a charge carrier-transporting compound and a binder solution, coating the dispersion on an electrically conductive support, and then drying the coated material. The thickness of the electrophotographic photoreceptor thus prepared may be in the range of 3 to 30 µm, preferably 5 to 20 µm.

The preparation of an electrophotographic photoreceptor of Type (II) can be accomplished by vacuum-depositing a bisazo compound on an electrically conductive support to form a charge carrier-generating layer thereon or by dispersing finely divided grains of a bisazo compound in a proper solvent containing a binder resin, coating the dispersion on a support, drying the coated material to form a charge carrier-generating layer thereon, and then optionally finishing the surface of the layer by a proper process such as buffing or otherwise adjusting the thickness of the film, coating a solution containing a charge carrier-transporting substance and a binder resin thereon, and drying the coated material. The thickness of the charge carrier-generating layer thus prepared may be in the range of 0.01 to 4 µm, preferably 0.1 to 2 µm. The thickness of the charge carrier-transporting layer may be in the range of 3 to 30 µm, preferably 5 to 20 µm.

The preparation of an electrophotographic photoreceptor of Type (III) can be accomplished by reversing the order of lamination of the electrophotographic photoreceptor of Type (II).

The bisazo compound to be incorporated in the photoreceptor of Types (I), (II) and (III) is subjected to dispersion in a dispersion apparatus such as ball mill, sand mill and oscillating mill to an average grain diameter to 0.1 to 2 µm, preferably 0.3 to 2 µm before use.

If the amount of the bisazo compound to be incorporated in the electrophotographic photoreceptor of Type (I) is too small, the photoreceptor thus obtained exhibits a poor sensitivity. On the contrary, if the amount of the bisazo compound to be incorporated in the electrophotographic photoreceptor is too large, the photoreceptor thus obtained exhibits a poor chargeability and a poor film strength in the electrophotographic light-sensitive layer. The weight proportion of the bisazo compound in the electrophotographic light-sensitive layer, if a binder is incorporated therein, may be in the range of 0.01 to 2 times, preferably 0.05 to 1 time that of the binder. The weight proportion of the charge carrier-transporting compound may be in the range of 0.1 to 2 times, preferably 0.3 to 1.5 times that of the binder. In the case of a charge carrier-transporting compound which can be used as a binder itself, the amount of the bisazo compound to be incorporated is preferably in the range of 0.01 to 0.5 times that of the charge carrier-transporting compound.

In the case where bisazo compound-containing layer in the preparation of an electrophotographic photoreceptor of Type (II) or (III), the amount of the bisazo compound to be incorporated is preferably in the range of 0.1 or more times that of the binder. If the value is less than this range, a sufficient sensitivity cannot be obtained. Such a bisazo compound can also be used in the absence of a binder. The weight proportion of the charge carrier-transporting compound to be incorporated in the charge carrier-transporting compound-containing layer may be in the range of 0.2 to 2 times, preferably 0.3 to 1.5 times that of the binder. In the case where a high molecular weight charge carrier-transporting compound which can be used as a binder itself is employed, such a compound can be used in the absence of any other binders.

The compound represented by the general formula (1-A), (1-B) or (1-C) may also be used in combination. The mixing ratio is arbitrary.

Examples of an electrically conductive support to be incorporated in the present electrophotographic photoreceptor include a plate of metal such as aluminum, copper and zinc, material comprising a sheet or film of plastic such as polyester with a electrically conductive material such as aluminum, indium oxide, tin oxide or copper iodide vacuum-deposited or dispersion-coated thereon, and paper treated with an inorganic salt such as sodium chloride and calcium chloride or an organic quaternary ammonium salt.

If a binder is used, as such a binder there may be preferably used a hydrophobic: high dielectric electrically insulating film-forming high molecular polymer. Specific examples of such a high molecular polymer will be set forth below, but the present invention should not be construed as being limited thereto.

Polycarbonate, polyester, polyester carbonate, polysulfone, methacrylic resin, acrylic resin, polyvinyl chloride, polyvinylidene chloride, polystyrene, polyvinyl acetate, styrene-butadiene copolymer, vinylidene chloride acrylonitrile copolymer, vinyl chloride TM vinyl acetate copolymer, vinyl chloride-vinyl acetate-maleic anhydride copolymer, silicone resin, silicone alkyd resin, phenol-formaldehyde resin, styrene-alkyd resin, styrene-maleic anhydride copolymer, phenoxy resin, polyvinylbutyral resin, and poly-N-vinylcarbazole.

These resin binders can be used singly or in admixture.

In the present photoreceptor, a plasticizer can be used in admixture with a resin binder.

Examples of such a plasticizer which can be used in the present invention include biphenyl, biphenyl chloride, o-terphenyl, p-terphenyl, dibutyl phthalate, dimethyl glycol phthalate, dioctyl phthalate, triphenylphosphoric acid, chlorinated paraffin, and dilauryl thiodipropionate.

In the preparation of the present electrophotographic photoreceptor, an additive such as a sensitizer may be incorporated in the light-sensitive layer.

Examples of such a sensitizer include triallyl methane dyes such as Brilliant Green, Victorian Blue B, Methyl Violet, Crystal Violet and Acid Violet 6B, xanthene dyes such as Rhodamine B, Rhodamine 6G, Rhodamine G Extra, Eosine S, Erythrosine, Rose Bengal and Fluoresceine, thiazine dyes such as Methylene Blue, astrazone dyes such as C.I. Basic Violet 7 (e.g., C.I.48020), cyanine dyes, and pyrilium dyes such as 2,6-diphenyl-4-(N,N-dimethylaminophenyl) thiapyrilium perchlorate and benzopyrilium salt (as described in JP-B-48-25658).

In order to improve the surface characteristics of the electrophotographic photoreceptor, a silicone oil, fluorine surface active agent or the like may be used.

Electric charge carrier-transporting substances to be incorporated in the electric charge carrier-transporting layer of the present invention can be classified into two kinds of compounds: compounds which transport electrons and compounds which transport positive holes. The electrophotographic photoreceptor of the present invention can comprise either of the two types of compounds.

As such a compound which transports electrons there can be used a compound containing an electron attractive group. Examples of such a compound include 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorenone, tetranitrocarbazole, chloranil, 2,3-dichloro-5,6-dicyanobenzoquinone, 2,4,7- trinitro -9 ,10-phenanthrenequinone, tetrachlorophthalic anhydride, tetracyanoethylene, and tetracyanoquinodimethane.

As such a compound which transports positive holes there can be used a compound containing an electron-donating group.

Examples of such a compound having a high molecular weight include:

(a) Polyvinyl carbazoles and derivatives thereof as described in JP-B-34-10966;

(b) Vinyl polymers as described in JP-B-43-18674 and JP-B-43-19192 such as polyvinyl pyrene polyvinyl anthracene, poly-2-vinyl-4-(4'-dimethylaminophenyl)-5-phenyloxazole and poly-3-vinyl-N-ethylcarbazole;

(c) Polymers as described in JP-B-43-19193 such as copolymers of styrene with polyacenaphthylene, polyindene or acenaphthylene;

(d) Condensed resins as described in JP-B-56-13940 such as pyrene-formaldehyde resin, bromopyrene-formaldehyde resin and ethylcarbazole-formaldehyde resin; and (e) Various triphenylmethane polymers as described in JP-A-56-90883 and JP-A-56-161550.

Examples of such a compound having a low molecular weight include:

(f) Triazole derivatives as described in U.S. Pat. No. 3,112,197;

(g) Oxadiazole derivatives as described in U.S. Pat. No. 3,189,447;

(h) Imidazole derivatives as described in JP-B-37-16096;

(i) Polyarylalkane derivatives as described in U.S. Pat. Nos. 3,615,402, 3,820,989 and 3,542,544, JP-B-45-555 and JP-B-51-10983, and JP-A-51-93224, JP-A-55-108667, JP-A-55-156953, and JP-A-56-36656;

(j) Pyrazoline derivatives and pyrazolone derivatives as described in U.S. Pat. Nos. 3,180,729 and 4,278,746, and JP-A-55-88064, JP-A-55-88065, JP-A-49-105537, JP-A-55-51086, JP-A-56-80051, JP-A-56-88141, JP-A-57-45545, JP-A-54-112637 and JP-A-55-74546;

(k) Phenylenediamine derivatives as described in U.S. Pat. No. 3,615,404, JP-B-51-10105, JP-B-46-3712 and JP-B-47-28336, and JP-A-54-83435, JP-A-54-110836 and JP-A-54-119925;

(l) Arylamine derivatives as described in U.S. Pat. Nos. 3,567,450, 3,180,703, 3,240,597, 3,658,520, 4,232,103, 4,175,961 and 4,012,376, West German Patent (DAS) 1,110,518, JP-B-49-35702 and JP-B-39-27577, and JP-A-55-144250, JP-A-56-119132 and JP-A-56-22437;

(m) Amino-substituted chalcone derivatives as described in U.S. Pat. No. 3,526,501;

(n) N,N-bicarbazyl derivatives as described in U.S. Pat. No. 3,542,546;

(o) Oxazole derivatives as described in U.S. Pat. No. 3,257,203;

(p) Styrylanthracene derivatives as described in JP-A-56-46234;

(q) Fluorenone derivatives as described in JP-A-54-110837;

(r) Hydrazone derivatives as described in U.S. Pat. No. 3,717,462, and JP-A-54-59143 (U.S. Pat. No. 4,150,987), JP-A-55-52063, JP-A-55-52064, JP-A-55-46760, JP-A-55-85495, JP-A-57-11350, JP-A-57-148749 and JP-A-57-104144;

(s) Benzidine derivatives as described in U.S Pat. Nos. 4,047,948, 4,047,949, 4,265,990, 4,273,846, 4,299,897 and 4,306,008; and (t) Stilbene derivatives as described in JP-A-58-190953, JP-A-59-95540, JP-A-59-97148, JP-A-59-195658 and JP-A-62-36674.

In the present invention, the charge carrier-transporting compounds should not be construed as being limited to those belonging to the compound groups (a) to (t). All charge carrier-transporting compounds which have heretofore been known can be used.

Alternatively, a charge transporting compound may be incorporated in the charge-generating layer.

In the present electrophotographic photo-receptor, an adhesive layer or barrier layer can be optionally provided between the electrically conductive support and the light-sensitive layer. As examples of materials to be incorporated in these layers there can be used polymers which can be the same as the above described binder. Other examples of materials to be incorporated in these layers include gelatin, casein, polyvinyl alcohol, ethyl cellulose, carboxymethyl cellulose, vinylidene chloride polymer latexes as described in JP-A-59-84247, styrene-butadiene polymer latexes as described in JP-A-59-114544, and aluminum oxide. The thickness of these layers is preferably in the range of 1 μm or less.

The electrophotographic photoreceptor thus obtained can be treated properly so as to protect itself from an interference band produced when an interfering light such as laser is used for exposure. There have been proposed many such treatment methods. For example, JP-A-60-186850 proposes the provision of an undercoating layer having a light scattering surface. JP-A-60-184258 proposes the provision of a titanium black-containing undercoating layer. JP-A-58-82249 proposes the absorption of a major part of light to be used in a charge carrier-generating layer. JP-A-61-18963 proposes that a charge carrier-transporting layer have a microphase separating structure. JP-A-60-86550 proposes the incorporation of a substance which absorbs or scatters an interfering light in a photoconductive layer. JP A 63-106757 proposes the provision of an indentation having a depth of one-fourth of the wavelength of an interfering light on the surface of a photoreceptor. JP-A-62-172371 and JP-A-62-174771 proposes the provision of a light-scattering layer or light-absorbing layer on the back surface of a transparent support.

The present electrophotographic photoreceptor has been described in detail. The present electrophotographic photoreceptor generally exhibits a high sensitivity and a small change in the electrophotographic properties after repeated use.

The present electrophotographic photoreceptor can be widely used in electrophotographic copying machines as well as in the field of photoreceptors for printers using laser, CRT, LED or the like as the light source.

A photoconductive composition containing the present bisazo compound can be used as a photoconductive layer in the pickup tube for video camera or as a photoconductive layer having a light-receiving layer (photoconductive layer) in a solid-state imaging device provided on the entire surface of one-dimensionally or two-dimensionally arranged semiconductor circuit for signal transfer or scanning. As described in A. K. Ghosh, Tom Feng, J. Appl. Phys., 49 (12), 5982 (1978), such a photoconductive composition can also be used as a photoconductive layer for solar cell.

The present bisazo compound can further be used as photoconductive colored grains in a photoelectrophoresis system or colored grains of dry or wet process electrophotographic developer.

As disclosed in JP-B-37-17162, and JP-A-55-9063, JP-A-55-161250 and JP-A-57-147656, a high resolution, durability and sensitivity printing plate and printed circuit can be prepared by dispersing the present bisazo compound in an alkalki-soluble resin such as phenol resin together with the above described electric charge carrier-transporting compound such as an oxadiazole derivative and hydrazone derivative, coating the dispersion on an electrically conductive support such as aluminum, drying the coated material, exposing imagewise the material to light, subjecting the material to toner development, and then etching the material with an aqueous solution of an alkali.

The present invention will be further described in the following examples, but the present invention should not be construed as being limited thereto. Unless otherwise indicated, all parts are by weight.

EXAMPLE A-1

5 parts by weight of a bisazo compound belonging to Compound Group No. (1) in Table 1-A wherein Cp' is (Cp'-21) and 5 parts by weight of a polyester resin (Vylon 200; Toyobo Co., Ltd.) were added to 50 parts by weight of tetrahydrofuran. The mixture was then subjected to dispersion in a ball mill over 12 hours. The dispersion was then coated on an electrically conductive support (Toray Industries Inc.'s Metalme 75TS; 75-μm polyethyleneterephthalate support having an aluminum-deposited film thereon) by means of a wire round rod, and dried to obtain a charge-generating layer having a thickness of about 0.5 μm.

A solution obtained by mixing 3.6 part by weight of p-(diphenylamino)benzaldehyde-N'-methyl-N'-phenylhydrazone of the general formula:

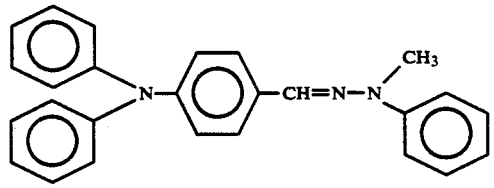

4 parts by weight of a polycarbonate resin (Panlite K-1300; Teijin Limited), 13.3 parts by weight of dichloromethane and 26.6 parts by weight of 1,2-dichloroethane was coated on the charge-generating layer by means of an applicator to form a 18-μm thick charge-transporting layer thereon. Thus, an electrophotographic photoreceptor comprising a light-sensitive layer consisting of two layers was prepared.

The electrophotographic photoreceptor thus prepared was then evaluated for electrophotographic properties in a static process by means of a static copying paper tester (Kawaguchi Denki Seisakusho K.K.'s Model SP-428). Specifically, the photoreceptor was first measured for initial surface potential $V_S$ developed shortly after being corona-charged ($-6$ kv) and surface potential $V_o$ left after being stored in a dark place for 30 seconds. The photoreceptor was then exposed to light from a tungsten lamp in such a manner that the illuminance on the surface of the photoreceptor reached 3 lux. The photoreceptor was then measured for exposure $E_{50}$ such that the surface potential before exposure is attenuated to half the initial surface potential $V_O$ and surface potential left 30 seconds after exposure (residual potential $V_R$). This measurement process was repeated 3,000 times. The results are set forth in Table A-5.

TABLE A-5

|  | $E_{50}$ (Lux · sec) | $V_S$ (−V) | $V_O$ (−V) | $V_R$ (−V) |
|---|---|---|---|---|
| 1st time | 2.3 | 900 | 800 | 0 |
| 3000th time | 2.4 | 850 | 760 | 2 |

EXAMPLES A-2 to A-25

Two-layer electrophotographic photoreceptors were prepared in the same manner as in Example A-1 except that 5 parts by weight of the bisazo compound belonging to Compound Group No. (1) in Table 1-A wherein Cp' is (Cp'-21) was replaced by those set forth in Table A-6. These specimens were then measured for $E_{50}$, $V_S$, $V_O$ and $V_R$ in the same manner as in Example A-1. The results are set forth in Table A-6.

men reached 2.0 lux. As a result, the specimen exhibited a half reduction exposure $E_{50}$ of 3.5 lux.sec.

The specimen was then charged at a surface potential of $+500$ V in a dark place. The specimen was then imagewise exposed to light with a transparent original of positive image brought into close contact thereto. The specimen was then immersed in a liquid developer comprising 1 l of Isopar H (petroleum solvent produced by Esso Standard), 5 g of finely dispersed polymethyl methacrylate (toner) and 0.01 g of soybean oil lecithin. As a result, a sharp positive toner image could be obtained.

The specimen was then heated to a temperature of 100° C. over 30 seconds to fix the toner image. The printing plate material was immersed in an etching solution obtained by dissolving 70 g of sodium metasilicate hydrate in 140 ml of glycerin, 550 ml of ethylene glycol and 150 ml of ethanol over 1 minute. The printing plate material was washed in a water flow with light brushing to remove the light-sensitive layer on the portion free of the toner. Thus, the desired printing plate was obtained.

The printing plate thus prepared was then used for printing by means of Hamada Star 600 CD Offset Printer. As a result, 50,000 sheets of extremely sharp printed matters free of any stain on the background were obtained.

EXAMPLE B-1

5 parts by weight of a bisazo compound belonging to Compound Group No. (1) in Table 1-B wherein Cp' is (Cp'-21) in Table 2 and 5 parts by weight of a polyester resin (Vylon 200; Toyobo Co., Ltd.) were added to 50

TABLE A-6

| | Bisazo Compound | | 1st time | | | | 300th time | | | |
|---|---|---|---|---|---|---|---|---|---|---|
| Example No. | Compound Group No. | Cp' No. | $E_{50}$ (LUX · SEC) | $V_S$ (−V) | $V_O$ (−V) | $V_R$ (−V) | $E_{50}$ (LUX · SEC) | $V_S$ (−V) | $V_O$ (−V) | $V_R$ (−V) |
| A-2 | (1) | Cp'-50 | 1.5 | 890 | 790 | 0 | 1.7 | 830 | 750 | 0 |
| A-3 | (2) | Cp'-22 | 2.0 | 920 | 810 | 0 | 2.1 | 870 | 780 | 1 |
| A-4 | (3) | Cp'-22 | 3.2 | 910 | 800 | 0 | 3.1 | 880 | 800 | 0 |
| A-5 | (7) | Cp'-111 | 4.0 | 900 | 800 | 0 | 4.3 | 870 | 790 | 0 |
| A-6 | (9) | Cp'-1 | 2.3 | 860 | 750 | 0 | 2.4 | 820 | 740 | 3 |
| A-7 | (12) | Cp'-21 | 2.2 | 870 | 750 | 0 | 2.1 | 840 | 750 | 0 |
| A-8 | (13) | Cp'-51 | 1.8 | 900 | 800 | 0 | 1.9 | 870 | 790 | 1 |
| A-9 | (16) | Cp'-3 | 2.9 | 920 | 800 | 0 | 2.9 | 900 | 780 | 0 |
| A-10 | (18) | Cp'-22 | 3.0 | 880 | 750 | 0 | 3.1 | 870 | 730 | 0 |
| A-11 | (20) | Cp'-4 | 2.6 | 890 | 730 | 0 | 2.8 | 880 | 720 | 3 |
| A-12 | (25) | Cp'-111 | 1.9 | 900 | 790 | 0 | 2.0 | 850 | 730 | 0 |
| A-13 | (27) | Cp'-53 | 3.5 | 910 | 810 | 0 | 3.6 | 900 | 790 | 1 |
| A-14 | (31) | Cp'-21 | 4.0 | 860 | 770 | 0 | 4.1 | 850 | 750 | 4 |
| A-15 | (34) | Cp'-21 | 4.2 | 900 | 790 | 0 | 4.4 | 870 | 770 | 2 |

5 parts by weight of a bisazo compound belonging to Compound Group (1) in Table 1-A wherein Cp' is (Cp'-1), 40 parts by weight of the same hydrazone compound as used in Example A-1 and 100 parts of a copolymer of benzyl methacrylate and methacrylic acid ([η] 30° C. in methyl ethyl ketone: 0.12; methacrylic acid content: 32.9%) were added to 660 parts by weight of dichloromethane. The mixture was then subjected to dispersion in a ball mill over 12 hours. The dispersion was then coated on a 0.25-mm thick grained aluminum plate, and dried to prepare an electrophotographic printing plate material comprising a 6-μm thick electrophotographic light-sensitive layer.

The specimen was then subjected to corona discharge at +6 KV in a dark place so that the light-sensitive layer was charged at a surface potential of 500 V. The specimen was then exposed to light from a tungsten lamp with a color temperature of 2,854° K. in such a manner that the illuminance on the surface of the speciparts by weight of tetrahydrofuran. The mixture was then subjected to dispersion in a ball mill over 12 hours. The dispersion was then coated on an electrically conductive support (Toray Industries Inc.'s Metalme 75TS; 75-μm polyethyleneterephthalate support comprising an aluminum-deposited film thereon) by means of a wire round rod, and dried to obtain a charge-generating layer having a thickness of about 0.5 μm.

A solution obtained by mixing b 3.6 parts by weight of p-(diphenylamino)benzaldehyde-N'-methyl-N'-phenylhydrazone of the general formula:

B-1 except that the bisazo compound was replaced by a bisazo compound set forth in Table B-6. The specimen was then measured for E50, $V_S$, $V_O$ and $V_R$ in the same manner as in Example 1. The results are set forth in Table B-6.

TABLE B-6

| Example No. | Bisazo Compound Compound Group No. | Cp' No. | 1st time E50 (LUX · SEC) | $V_S$ (−V) | $V_O$ (−V) | $V_R$ (−V) | 300th time E50 (LUX · SEC) | $V_S$ (−V) | $V_O$ (−V) | $V_R$ (−V) |
|---|---|---|---|---|---|---|---|---|---|---|
| B-2 | (1) | (Cp'-1) | 1.3 | 950 | 820 | 0 | 1.3 | 880 | 790 | 0 |
| B-3 | (1) | (Cp'-22) | 1.1 | 920 | 750 | 0 | 1.2 | 890 | 730 | 5 |
| B-4 | (1) | (Cp'-111) | 1.4 | 990 | 770 | 0 | 1.4 | 950 | 760 | 0 |
| B-5 | (8) | (Cp'-46) | 1.6 | 980 | 880 | 10 | 1.8 | 920 | 800 | 15 |
| B-6 | (8) | (Cp'-99) | 1.1 | 890 | 790 | 0 | 1.3 | 820 | 700 | 0 |
| B-7 | (11) | (Cp'-6) | 1.5 | 930 | 800 | 0 | 1.5 | 870 | 710 | 0 |
| B-8 | (14) | (Cp'-51) | 1.2 | 950 | 820 | 0 | 1.2 | 900 | 730 | 0 |
| B-9 | (15) | (Cp'-109) | 1.7 | 910 | 730 | 20 | 1.9 | 820 | 690 | 30 |
| B-10 | (18) | (Cp'-25) | 1.9 | 910 | 780 | 0 | 2.0 | 800 | 730 | 5 |
| B-11 | (18) | (Cp'-77) | 1.8 | 900 | 800 | 0 | 2.0 | 810 | 730 | 0 |
| B-12 | (23) | (Cp'-7) | 1.0 | 960 | 770 | 0 | 1.1 | 930 | 700 | 0 |
| B-13 | (23) | (Cp'-33) | 1.4 | 930 | 720 | 0 | 1.5 | 850 | 670 | 0 |
| B-14 | (23) | (Cp'-169) | 1.2 | 880 | 700 | 0 | 1.3 | 820 | 650 | 0 |
| B-15 | (24) | (Cp'-120) | 1.6 | 960 | 810 | 0 | 1.8 | 920 | 750 | 0 |
| B-16 | (24) | (Cp'-180) | 1.3 | 940 | 830 | 0 | 1.3 | 890 | 760 | 0 |
| B-17 | (27) | (Cp'-52) | 1.5 | 990 | 860 | 0 | 1.6 | 920 | 810 | 0 |
| B-18 | (28) | (Cp'-24) | 1.2 | 850 | 720 | 0 | 1.2 | 760 | 620 | 5 |

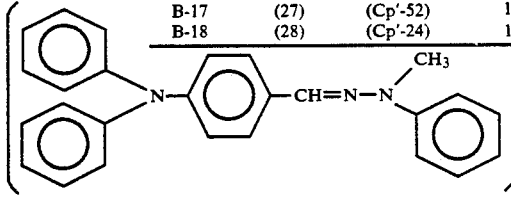

4 parts by weight of a polycarbonate resin (Panlite K-1300; Teijin Limited), 13.3 parts by weight of dichloromethane and 26.6 parts by weight of 1,2-dichloroethane was coated on the charge-generating layer by means of an applicator to form a 17-μm thick charge-transporting layer thereon. Thus, an electrophotographic photoreceptor comprising a light-sensitive layer consisting of two layers was prepared.

The electrophotographic photoreceptor thus prepared was then evaluated for electrophotographic properties in a static process by means of a static copying paper tester (Kawaguchi Denki Seisakusho K.K.'s Model SP-428). Specifically, the light-sensitive material was first measured for initial surface potential $V_S$ developed shortly after being corona-charged (−6 kv) and surface potential $V_O$ left after being stored in a dark place for 30 seconds. The photoreceptor was then exposed to light from a tungsten lamp in such a manner that the illuminance on the surface of the photoreceptor reached 3 lux. The photoreceptor was then measured for exposure E50 such that the surface potential before exposure is attenuated to half the initial surface potential $V_O$ and surface potential left 30 seconds after exposure (residual potential $V_R$). This measurement process was repeated 3,000 times. The results are set forth in Table B-5.

TABLE B-5

|  | 1st time | 3000th time |
|---|---|---|
| E50 (lex · sec) | 1.2 | 1.3 |
| $V_S$ (−V) | 920 | 890 |
| $V_O$ (−V) | 780 | 750 |
| $V_R$ (−V) | 0 | 0 |

EXAMPLES B-2 to B-18

Two-layer electrophotographic photoreceptors specimen were prepared in the same manner as in Example B-1 except that the bisazo compound was replaced by a bisazo compound set forth in Table B-6. The specimen was then measured for E50, $V_S$, $V_O$ and $V_R$ in the same manner as in Example 1. The results are set forth in Table B-6.

EXAMPLE B-19

A solution of 7.5 parts by weight of the same hydrazone compound as used in Example 1 and 10 parts by weight of a polycarbonate of bisphenol A in 50 parts by weight of dichloromethane was coated on an electrically conductive support comprising a polyethyleneterephthalate film with an aluminum film vacuum-deposited thereon by means of a wire round rod, and dried to obtain a charge-transporting layer having a thickness of about 12 μm.

2 parts by weight of the bisazo compound as used in Example B-1 and a solution of 2 parts by weight of a polyester resin (Vylon 200; Toyobo Co., Ltd.) in 5 parts by weight of a chlorobenzene were together subjected to dispersion in a paint shaker over 1 hour. The dispersion was then coated on the charge-transporting layer by means of wire round rod, and dried to form a 1 μm thick charge-generating layer thereon. Thus, an electrophotographic receptor for positive electrification comprising a two-layer electrophotographic light-sensitive layer was prepared.

The electrophotographic photoreceptor thus prepared was then evaluated for electrophotographic properties in a static process by means of a static copying paper tester (Kawaguchi Denki Seisakusho K.K.'s Model SP-428). Specifically, the photoreceptor was first measured for initial surface potential $V_S$ developed shortly after being corona-charged (+6 kv) and surface potential $V_O$ left after being stored in a dark place for 30 seconds. The photoreceptor was then exposed to light from a tungsten lamp in such a manner that the illuminance on the surface of the photoreceptor reached 3 lux. These photoreceptors were then measured for exposure E50 such that the surface potential before exposure is attenuated to half the initial surface potential $V_O$ and surface potential left 30 seconds after exposure (residual potential $V_R$). This measurement process was repeated 3.000 tlmes. The results are set forth in Table B-7.

TABLE B-7

|  | 1st time | 3,000 time |
|---|---|---|
| $E_{50}$ (lex · sec) | 1.6 | 1.8 |
| $V_S$ (−V) | 890 | 850 |
| $V_O$ (−V) | 720 | 690 |
| $V_R$ (−V) | 10 | 30 |

EXAMPLE B-20

5 parts by weight of the same bisazo compound as used in Example B-1, 40 parts by weight of the same hydrazone compound as used in Example B-1 and 100 parts of a copolymer of benzyl methacrylate and methacrylic acid ($[\eta]$ 30° C. in methyl ethyl ketone: 0.12; methacrylic acid content: 32.9%) were added to 660 parts by weight of dichloromethane. The mixture was then subjected to dispersion in a ball mill over 12 hours. . The dispersion was then coated on a 0.25-mm thick grained aluminum plate, and dried to prepare an electrophotographic printing plate material comprising a 6-μm thick electrophotographic light-sensitive layer.

The specimen was then subjected to corona discharge at +6 KV in a dark place so that the light-sensitive layer was charged at a surface potential of 500 V. The specimen was then exposed to light from a tungsten lamp with a color temperature of 2,854° K. in such a manner that the illuminance on the surface of the specimen reached 2.0 lux. As a result, the specimen exhibited a half reduction exposure $E_{50}$ of 2.2 lux sec.

The specimen was then charged at a surface potential of +500 V in a dark place. The specimen was then imagewise exposed to light with a transparent original of positive image brought into close contact thereto. The specimen was then immersed in a liquid developer comprising 5 g of polymethyl methacrylate (toner) and 0.01 g of soybean oil lecithin finely dispersed in 1,000 ml of Isopar H (petroleum solvent produced by Esso Standard). As a result, a sharp positive toner image could be obtained.

The specimen was then heated to a temperature of 100° C. over 30 seconds to fix the toner image. The printing plate material was immersed in an etching solution obtained by dissolving 70 g of sodium metasilicate hydrate in 140 ml of glycerin, 550 ml of ethylene glycol and 150 ml of ethanol over 1 minute. The printing plate material was washed in a water flow with light brushing to remove the light-sensitive layer on the portion free of the toner. Thus, the desired printing plate was obtained.

The printing plate thus prepared was then used for printing by means of Hamada Star 600 CD Offset Printer. As a result, 50,000 sheets of extremely sharp printed matters free of any stain on the background were obtained.

EXAMPLE C-1

5 parts by weight of a bisazo compound belonging to Compound Group No. (1) in Table 1 C wherein Cp' is (Cp'-21) and 5 parts by weight of a polyester resin (Vylon 200; Toyobo Co., Ltd.) were added to 50 parts by weight of tetrahydrofuran. The mixture was then subjected to dispersion in a ball mill over 12 hours. The dispersion was then coated on an electrically conductive support (Toray Industries Inc.'s Metalme 75TS; 75-μm polyethyleneterephthalate support comprising an aluminum-deposited film thereon) by means of a wire round rod, and dried to obtain a charge-generating layer having a thickness of about 0.5 μm.

A solution obtained by mixing 3.6 parts by weight of p-(diphenylamino)benzaldehyde-N'-methyl-N'-phenyl-hydrazone of the general formula:

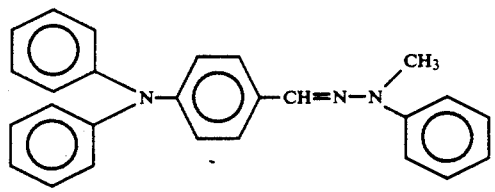

4 parts by weight of a polycarbonate resin (Panlite K-1300; Teijin Limited), 13.3 parts by weight of dichloromethane and 26.6 parts by weight of 1,2-dichloroethane was coated on the charge-generating layer by means of an applicator to form a 17-μm thick charge-transporting layer thereon. Thus, an electrophotographic photoreceptor comprising a light-sensitive layer consisting of two layers was prepared.

The electrophotographic photoreceptor thus prepared was then evaluated for electrophotographic properties in a static process by means of a static copying paper tester (Kawaguchi Denki Seisakusho K.K.'s Model SP-428). Specifically, the photoreceptor was first measured for initial surface potential $V_S$ developed shortly after being corona-charged (−6 kv) and surface potential $V_O$ left after being stored in a dark place for 30 seconds. The photoreceptor was then exposed to light from a tungsten lamp in such a manner that the illuminance on the surface of the photoreceptors reached 3 lux. The photoreceptor was then measured for exposure $E_{50}$ such that the surface potential before exposure is attenuated to half the initial surface potential $V_O$ and surface potential left 30 seconds after exposure (residual potential $V_R$). This measurement process was repeated 3,000 times. The results are set forth in Table C-5.

TABLE C-5

|  | $E_{50}$ (Lux · sec) | $V_S$ (−V) | $V_O$ (−V) | $V_R$ (−V) |
|---|---|---|---|---|
| 1st time | 2.6 | 920 | 800 | 0 |
| 3000th time | 2.6 | 880 | 730 | 1 |

EXAMPLES C-2 to C-15

Two-layer electrophotographic photoreceptor specimens were prepared in the same manner as in Example C-1 except that 5 parts by weight of the bisazo compound was replaced by bisazo compounds set forth in Table C-6, respectively. These specimens were then measured for $E_{50}$, $V_S$, $V_O$ and $V_R$ in the same manner as in Example C-1. The results are set forth in Table C-6.

TABLE C-6

| Example No. | Bisazo Compound Compound Group No. | Bisazo Compound Cp' No. | 1st time $E_{50}$ (LUX · SEC) | 1st time $V_S$ (−V) | 1st time $V_O$ (−V) | 1st time $V_R$ (−V) | 300th time $E_{50}$ (LUX · SEC) | 300th time $V_S$ (−V) | 300th time $V_O$ (−V) | 300th time $V_R$ (−V) |
|---|---|---|---|---|---|---|---|---|---|---|
| C-2 | (1) | (Cp'-50) | 2.3 | 900 | 780 | 0 | 2.3 | 850 | 760 | 0 |
| C-3 | (4) | (Cp'-22) | 3.5 | 920 | 810 | 0 | 3.6 | 900 | 780 | 2 |

TABLE C-6-continued

| Example No. | Bisazo Compound Compound Group No. | Cp' No. | 1st time E$_{50}$ (LUX·SEC) | V$_S$ (−V) | V$_O$ (−V) | V$_R$ (−V) | 300th time E$_{50}$ (LUX·SEC) | V$_S$ (−V) | V$_O$ (−V) | V$_R$ (−V) |
|---|---|---|---|---|---|---|---|---|---|---|
| C-4 | (6) | (Cp'-51) | 2.7 | 880 | 760 | 0 | 2.7 | 850 | 720 | 0 |
| C-5 | (8) | (Cp'-111) | 2.1 | 870 | 760 | 0 | 2.1 | 830 | 710 | 0 |
| C-6 | (9) | (Cp'-1) | 3.3 | 900 | 770 | 0 | 3.4 | 870 | 740 | 2 |
| C-7 | (12) | (Cp'-21) | 1.9 | 930 | 810 | 0 | 2.0 | 890 | 760 | 1 |
| C-8 | (15) | (Cp'-50) | 3.0 | 860 | 730 | 0 | 3.1 | 830 | 710 | 1 |
| C-9 | (17) | (Cp'-3) | 2.9 | 860 | 700 | 0 | 3.0 | 810 | 670 | 1 |
| C-10 | (19) | (Cp'-22) | 1.8 | 910 | 820 | 0 | 1.8 | 830 | 750 | 1 |
| C-11 | (21) | (Cp'-4) | 3.0 | 880 | 750 | 0 | 3.0 | 830 | 700 | 0 |
| C-12 | (22) | (Cp'-111) | 2.2 | 900 | 790 | 0 | 2.2 | 860 | 760 | 0 |
| C-13 | (23) | (Cp'-53) | 3.0 | 860 | 790 | 0 | 3.0 | 830 | 750 | 0 |
| C-14 | (30) | (Cp'-3) | 2.2 | 870 | 720 | 0 | 2.2 | 840 | 700 | 0 |
| C-15 | (34) | (Cp'-10) | 3.1 | 890 | 730 | 0 | 3.1 | 840 | 690 | 0 |

EXAMPLE C-16

5 parts by weight of a bisazo compound belonging to Compound Group (1) in Table 1-C wherein Cp' is (Cp'-21), 40 parts by weight of the same hydrazone compound as used in Example C-1 and 100 parts of a copolymer of benzyl methacrylate and methacrylic acid ($[\eta]$ 30° C. in methyl ethyl ketone: 0.12; methacrylic acid content: 32.9%) were added to 660 parts by weight of dichloromethane. The mixture was then subjected to dispersion in a ball mill over 12 hours. The dispersion was then coated on a 0.25-mm thick grained aluminum plate, and dried to prepare an electrophotographic printing plate material comprising a 6-μm thick electrophotographic light-sensitive layer.

The specimen was then subjected to corona discharge at +6 kv in a dark place so that the light-sensitive layer was charged at a surface potential of 500 V. The specimen was then exposed to light from a tungsten lamp with a color temperature of 2,854° K. in such a manner that the illuminance on the surface of the specimen reached 2.0 lux. As a result, the specimen exhibited a half reduction exposure E$_{50}$ of 2.2 lux.sec.

The specimen was then charged at a surface potential of +500 V in a dark place. The specimen was then imagewise exposed to light with a transparent original of positive image brought into close contact thereto. The specimen was then immersed in a liquid developer comprising 1 l of Isoper H (petroleum solvent produced by Esso Standard), 5 g of finely dispersed polymethyl methacrylate (toner) and 0.01 g of soybean oil lecithin. As a result, a sharp positive toner image could be obtained.

The specimen was then heated to a temperature of 100° C. over 30 seconds to fix the toner image. The printing plate material was immersed in an etching solution obtained by dissolving 70 g of sodium metasilicate hydrate in 140 ml of glycerin, 550 ml of ethylene glycol and 150 ml of ethanol over 1 minute. The printing plate material was washed in a water flow with light brushing to remove the light-sensitive layer on the portion free of the toner. Thus, the desired printing plate was obtained.

The printing plate thus prepared was then used for printing by means of Hamada Star 600 CD Offset Printer. As a result, 50,000 sheets of extremely sharp printed matters free of any stain on the background were obtained.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising on an electrically conductive support a layer containing a charge carrier-transporting compound and a charge carrier-generating compound or a charge carrier-transporting compound-containing layer and a charge-generating compound-containing layer, wherein said charge carrier-generating compound is a bisazo compound represented by the formula (1-A), (1-B) or (1-C):

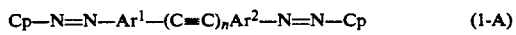

$$Cp-N=N-Ar^1-(C\equiv C)_n Ar^2-N=N-Cp \qquad (1\text{-A})$$

wherein Ar$^1$ and Ar$^2$ each represents an arylene group, divalent condensed polycyclic aromatic group or divalent heterocyclic aromatic group; Cp represents a coupler residue; and n represents an integer 2 or 3;

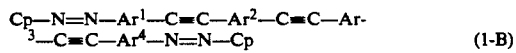

$$Cp-N=N-Ar^1-C\equiv C-Ar^2-C\equiv C-Ar^3-C\equiv C-Ar^4-N=N-Cp \qquad (1\text{-B})$$

wherein Ar$^1$, Ar$^2$, Ar$^3$ and Ar$^4$ each represents an arylene group, divalent condensed polycyclic aromatic group or divalent heterocyclic aromatic group; and Cp represents a coupler residue;

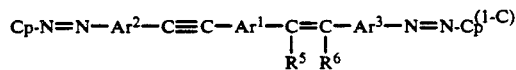

$$Cp-N=N-Ar^2-C\equiv C-Ar^1-\underset{R^5}{C}=\underset{R^6}{C}-Ar^3-N=N-Cp \qquad (1\text{-C})$$

wherein Ar$^1$, Ar$^2$, and Ar$^3$ each represents an arylene group, divalent condensed polycyclic aromatic group or divalent heterocyclic aromatic group; Cp represents a coupler residue; and R$^5$ and R$^6$ each represents a hydrogen atom, alkyl group, alkoxy group, cyano group, nitro group or halogen atom.

2. An electrophotographic photoreceptor as in claim 1, wherein Ar$^1$, Ar$^2$, Ar$^3$ and Ar$^4$ each represents a member selected from the group consisting of phenylene, naphthalene, antolylene, biphenylene, terphenylene, indene, fluorene, acenaphthene, perylene, fluorenone, anthrone, isocoumarin, pyridine, quinoline, oxazole, thiazole, oxadiazole, benzoxazole, benzoimidazole, benzothiazole, benzotriazole, dibenzofuran, carbazole and xanthene, wherein these substituents may be used singly or in combination and if a plurality of substituents are used they may be the same or different and may be connected at any positions.

3. An electrophotographic photoreceptor as in claim 1, wherein substituents for Ar$^1$, Ar$^2$, Ar$^3$, and Ar$^4$ are selected from the group consisting of a C$_{1-18}$ alkyl group, a C$_{1-18}$ alkoxy group, a dialkylamino group containing two C$_{1-18}$ alkyl groups, a C$_{1-18}$ acyl group, a $C_{1-18}$ acyloxy group, a $C_{1-18}$ amide group, a $C_{6-15}$ aryl group, a $C_{6-15}$ aryloxy group, a halogen atom, a hydroxy group, a carboxyl group, a nitro group, a cyano group, and a trifluoromethyl group.

4. An electrophotographic photoreceptor as in claim 1, wherein said bisazo compound is dispersed in the form of particles having an average diameter of from 0.1 to 2 μm.

5. An electrophotographic photoreceptor as in claim 1, wherein Cp represents:

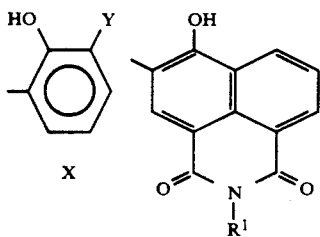

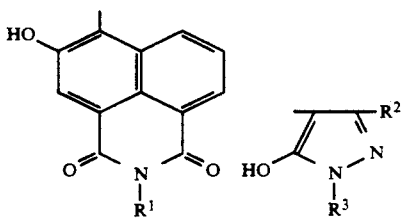

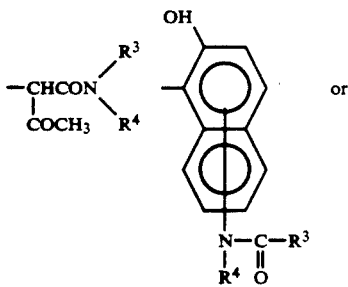

-continued

B

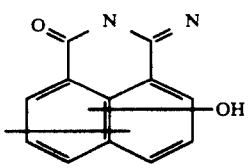

wherein
X represents an atomic group which is required to be condensed with the benzene ring to which the hydroxy group and Y are bonded to form an aromatic group or a heterocyclic group;

Y represents $-CONR^3R^4$, $-CONH=CR^3R^4$ or $-COOR^3$ or a 5- or 6-membered heterocyclic group which may be substituted;

$R^1$ represents $C_{1-12}$ alkyl or $C_{6-24}$ aryl group each of which may be substituted;

$R^2$ represents a hydrogen atom, $C_{1-6}$ lower alkyl group, a carbamoyl group, a carboxyl group, an alkoxycarbonyl group containing $C_{1-12}$ alkoxy group, an aryloxycarbonyl group containing $C_{6-20}$ aryloxy group, or a substituted or unsubstituted amino group;

$R^3$ represents an alkyl group, an aromatic carbon ring group, or an aromatic heterocyclic group, each of which may be substituted;

$R^4$ represents a hydrogen atom or has the same meaning as $R^3$; and

B represents a divalent aromatic hydrocarbon group, each of which may be substituted.

6. An electrophotographic photoreceptor as in claim 1, wherein $Ar^1$, $Ar^2$, $Ar^3$, and $Ar^4$ are phenylene or naphthalene.

7. An electrophotographic photoreceptor as in claim 1, wherein the layer containing said bisazo compound further contains a binder and said azo compound is present in said layer in an amount of from 0.01 to 2 times that of the binder.

8. An electrophotographic photoreceptor as in claim 1, wherein $R^5$ and $R^6$ are selected from the group consisting of a $C_{1-6}$ alkyl group and a $C_{1-6}$ alkoxy group.

9. An electrophotographic photoreceptor as in claim 1, comprising on an electrically conductive support an electrophotographic light-sensitive layer with said bisazo compound dispersed in a binder or charge-transporting medium.

10. An electrophotographic photoreceptor as in claim 1, comprising on an electrically conductive support a charge carrier-generating layer containing said bisazo compound as a main component and a charge carrier-transporting layer provided thereon.

11. An electrophotographic photoreceptor as in claim 1, comprising on an electrically conductive support a charge carrier-transporting layer and charge carrier generating layer containing a bisazo compound as a main component provided thereon.

* * * * *